United States Patent
Takizawa et al.

(10) Patent No.: US 10,614,757 B2
(45) Date of Patent: Apr. 7, 2020

(54) FLEXIBLE DISPLAY DEVICE AND METHOD FOR DETECTING BENDING STATE THEREOF

(71) Applicant: Sharp Kabushiki Kaisha, Sakai, Osaka (JP)

(72) Inventors: Kazuo Takizawa, Sakai (JP); Noritaka Kishi, Sakai (JP); Naoko Gotoh, Sakai (JP); Hideki Uchida, Sakai (JP); Katsuhiro Kikuchi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 53 days.

(21) Appl. No.: 15/770,526

(22) PCT Filed: Nov. 25, 2016

(86) PCT No.: PCT/JP2016/084934
§ 371 (c)(1),
(2) Date: Apr. 24, 2018

(87) PCT Pub. No.: WO2017/094604
PCT Pub. Date: Jun. 8, 2017

(65) Prior Publication Data
US 2019/0057649 A1    Feb. 21, 2019

(30) Foreign Application Priority Data
Dec. 2, 2015   (JP) ................. 2015-235388

(51) Int. Cl.
*G09G 3/3233* (2016.01)
*G01B 7/16* (2006.01)
(Continued)

(52) U.S. Cl.
CPC ............. *G09G 3/3233* (2013.01); *G01B 7/16* (2013.01); *G09G 3/3266* (2013.01);
(Continued)

(58) Field of Classification Search
CPC .. G09G 3/3233; G09G 3/3266; G09G 3/3275; G09G 2320/0233;
(Continued)

(56) References Cited

U.S. PATENT DOCUMENTS

2007/0229417 A1  10/2007  Giraldo et al.
2014/0125578 A1*  5/2014  Zhou ................... G09G 3/20
                                                               345/156
(Continued)

FOREIGN PATENT DOCUMENTS

JP    2014-190699 A    10/2014
WO    2005/109390 A1   11/2005
WO    2014/208459 A1   12/2014

OTHER PUBLICATIONS

Official Communication issued in International Patent Application No. PCT/JP2016/084934, dated Feb. 14, 2017.

*Primary Examiner* — Mark W Regn
(74) *Attorney, Agent, or Firm* — Keating & Bennett, LLP

(57) ABSTRACT

An organic EL panel 10 is a bendable display panel including a plurality of pixel circuits 60 each having a light emitting element and a drive element. A data line drive circuit 15 performs, by driving data lines, an operation of writing a voltage to a control terminal of the drive element and an operation of measuring a current flowing through the drive element for the pixel circuits 60 selected by a scanning line drive circuit 14. A bending detection unit 90 detects a bending state of the organic EL panel 10 based on a measurement result of the current flowing through the drive element. A correction unit 80 corrects a video signal VS1 based on the detected bending state. With this, the bending state of a screen is detected and a change in brightness or color when the screen is bent is prevented.

16 Claims, 15 Drawing Sheets

(51) Int. Cl.
  *G09G 3/3266* (2016.01)
  *G09G 3/3275* (2016.01)
(52) U.S. Cl.
  CPC ... *G09G 3/3275* (2013.01); *G09G 2320/0233* (2013.01); *G09G 2320/0242* (2013.01); *G09G 2320/0285* (2013.01); *G09G 2320/0295* (2013.01); *G09G 2320/043* (2013.01); *G09G 2320/0693* (2013.01); *G09G 2380/02* (2013.01)
(58) Field of Classification Search
  CPC ....... G09G 2320/0242; G09G 2380/02; G09G 2320/0285; G09G 2320/0295; G09G 2320/043; G09G 2320/0693; G01B 7/16
  See application file for complete search history.

(56) References Cited

U.S. PATENT DOCUMENTS

| | | | |
|---|---|---|---|
| 2014/0362304 A1* | 12/2014 | Wang | G06F 3/0412 349/12 |
| 2015/0091016 A1 | 4/2015 | Chen et al. | |
| 2015/0301636 A1 | 10/2015 | Akimoto et al. | |
| 2016/0093240 A1* | 3/2016 | Aurongzeb | G09G 3/3225 345/590 |
| 2016/0111044 A1 | 4/2016 | Kishi et al. | |
| 2017/0322596 A1* | 11/2017 | Zhao | G06F 3/041 |

* cited by examiner

Fig. 17
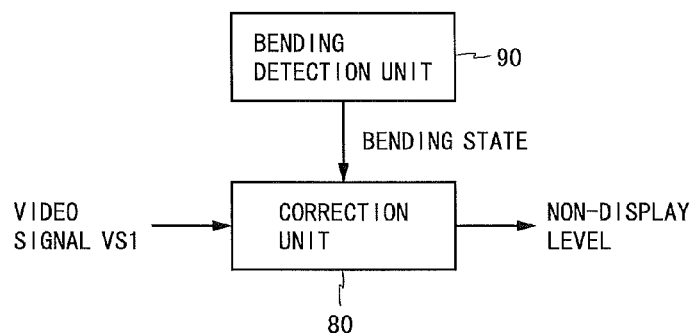
Fig. 18
| | DRIVE ELEMENT IN DISPLAY PIXEL CIRCUIT | DRIVE ELEMENT IN MEASUREMENT PIXEL CIRCUIT |
|---|---|---|
| CHANGE IN AMOUNT OF CURRENT WHEN SCREEN IS BENT | SMALL | LARGE |
Fig. 19
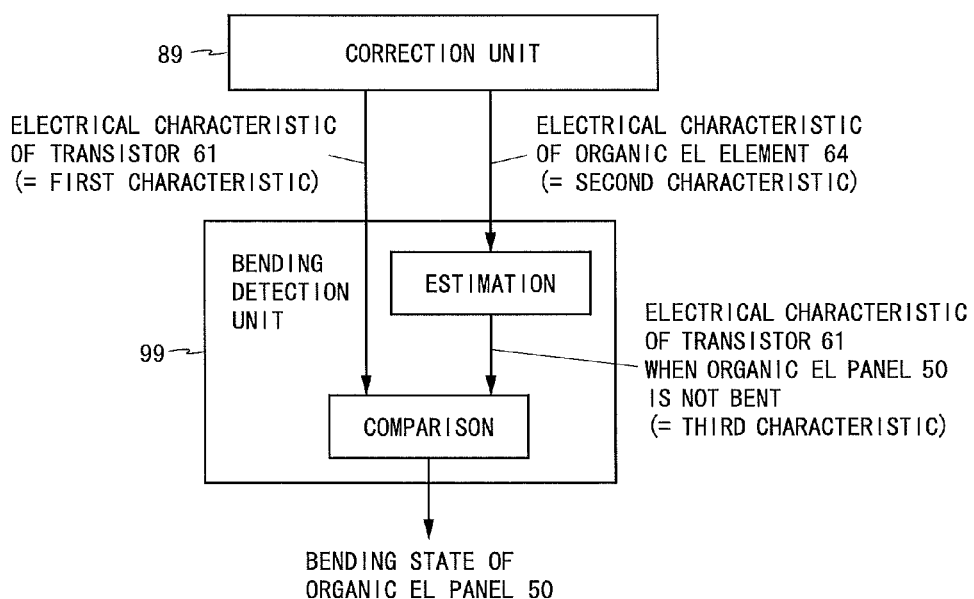

FLEXIBLE DISPLAY DEVICE AND METHOD FOR DETECTING BENDING STATE THEREOF

TECHNICAL FIELD

The present invention relates to a display device, and in particular to a flexible display device having a bendable screen.

BACKGROUND ART

In recent years, an organic EL (Electro Luminescence) display device has been attracting attention as a thin, low-power consumption, high-speed response display device. The organic EL display device can be configured so that a screen is bendable at an arbitrary position, by using a plastic substrate or the like (see FIG. 14). Hereinafter, a display device having a bendable screen is referred to as a "flexible display device".

For the flexible display device, the following techniques are known. Patent Document 1 describes a sensor device including a complementary type circuit shown in FIG. 15. In the complementary type circuit shown in FIG. 15, at least one of four transistors Tr1 to Tr4 is an organic TFT (Thin Film Transistor). Since an electrical characteristic of the organic TFT changes in accordance with a physical change, the organic TFT functions as a sensor element.

Patent document 2 describes a display device including a pixel circuit shown in FIG. 16. The pixel circuit shown in FIG. 16 includes complementary type transistors Tp, Tn as drive elements. When the screen is bent, characteristics of the transistors Tp, Tn change in opposite directions. Since a current flowing through one transistor increases and a current flowing through the other transistor decreases, fluctuation in a current can be suppressed for the entire pixel circuit.

PRIOR ART DOCUMENTS

Patent Documents

[Patent Document 1] Japanese Laid-Open Patent Publication No. 2014-190699
[Patent Document 2] WO2005/109390

SUMMARY OF THE INVENTION

Problems to be Solved by the Invention

In the flexible display device, when the screen is bent, characteristics (threshold voltage, I-V characteristics, and the like) of a drive element in a pixel circuit change and an amount of a current flowing through the drive element to a light emitting element changes. Thus, the flexible display device has a problem that brightness or color may change when the screen is bent.

Conventional flexible display devices cannot solve this problem appropriately. For example, a method described in Patent Document 1 using the organic TFT as the sensor element has a problem that it is impossible to distinguish between TFT characteristics change caused by bending of the screen and TFT characteristics change caused by other factors. Furthermore, this method also has a problem that an amount of a detected current is large.

Therefore, an object of the present invention to provide a display device capable of detecting a bending state of a screen and prevent a change in brightness or color when the screen is bent.

Means for Solving the Problems

According to a first aspect of the present invention, there is provided a flexible display device including: a bendable display panel including a plurality of scanning lines, a plurality of data lines, and a plurality of pixel circuits each having a light emitting element and a drive element; a scanning line drive circuit configured to select the pixel circuits by driving the scanning lines; a data line drive circuit configured to perform, by driving the data lines, an operation of writing a voltage to a control terminal of the drive element and an operation of measuring a current flowing through the drive element for the pixel circuits selected by the scanning line drive circuit; and a bending detection unit configured to detect a bending state of the display panel based on a measurement result of the current flowing through the drive element.

According to a second aspect of the present invention, in the first aspect of the present invention, the pixel circuits are classified into display pixel circuits and measurement pixel circuits, and the bending detection unit is configured to detect the bending state of the display panel based on the measurement result of the current flowing through the drive element in the measurement pixel circuit.

According to a third aspect of the present invention, in the second aspect of the present invention, the display pixel circuits are arranged inside a display area, and the measurement pixel circuits are arranged outside the display area.

According to a fourth aspect of the present invention, in the third aspect of the present invention, the display area has a rectangular shape, and the measurement pixel circuits are arranged along two adjacent sides of the display area.

According to a fifth aspect of the present invention, in the third aspect of the present invention, the display area has a rectangular shape, and the measurement pixel circuits are arranged along one side of the display area.

According to a sixth aspect of the present invention, in the second aspect of the present invention, an arrangement manner of the measurement pixel circuits is different from an arrangement manner of the display pixel circuits.

According to a seventh aspect of the present invention, in the sixth aspect of the present invention, an arrangement interval of the measurement pixel circuits is different from an arrangement interval of the display pixel circuits.

According to an eighth aspect of the present invention, in the second aspect of the present invention, the display pixel circuits and the measurement pixel circuits are arranged inside a display area in a mixed manner.

According to a ninth aspect of the present invention, in the second aspect of the present invention, the display panel has a multi-layer structure including a layer in which the display pixel circuits are formed and a layer in which the measurement pixel circuits are formed.

According to a tenth aspect of the present invention, in the second aspect of the present invention, an electrical characteristic of the drive element in the measurement pixel circuit is different from an electrical characteristic of the drive element in the display pixel circuit.

According to an eleventh aspect of the present invention, in the tenth aspect of the present invention, a size of the drive element in the measurement pixel circuit is different from a size of the drive element in the display pixel circuit.

According to a twelfth aspect of the present invention, in the tenth aspect of the present invention, a type of the drive element in the measurement pixel circuit is different from a type of the drive element in the display pixel circuit.

According to a thirteenth aspect of the present invention, in the first aspect of the present invention, the flexible display device further includes a correction unit configured to correct a video signal based on the bending state detected by the bending detection unit, wherein the data line drive circuit is configured to apply, to the data lines, voltages based on the video signal corrected by the correction unit.

According to a fourteenth aspect of the present invention, in the thirteenth aspect of the present invention, the correction unit is configured to correct the video signal so as to compensate for a change of an amount of the current flowing through the drive element, the change caused by bending.

According to a fifteenth aspect of the present invention, in the fourteenth aspect of the present invention, the bending detection unit includes a first table configured to store a curvature of the display panel corresponding to a difference from an initial value with respect to an electrical characteristic of the drive element, and is configured to detect the curvature of the display panel as the bending state of the display panel by referring to the first table using an obtained difference from the initial value with respect to the electrical characteristic of the drive element, and the correction unit includes a second table configured to store a correction amount of the electrical characteristic of the drive element corresponding to the curvature of the display panel, and is configured to obtain the correction amount of the electrical characteristic of the drive element by referring to the second table using the curvature obtained by the bending detection unit and correct the video signal using the obtained correction amount.

According to a sixteenth aspect of the present invention, in the fourteenth aspect of the present invention, the correction unit is configured to obtain a first characteristic being an electrical characteristic of the drive element and a second characteristic being an electrical characteristic of the light emitting element, and the bending detection unit is configured to estimate, based on the second characteristic, a third characteristic being the electrical characteristic of the drive element when the display panel is not bent, and detect the bending state of the display panel by comparing the first characteristic and the third characteristic.

According to a seventeenth aspect of the present invention, in the thirteenth aspect of the present invention, the correction unit is configured to correct the video signal corresponding to a bent portion, to a non-display level.

According to an eighteenth aspect of the present invention, there is provided a method for detecting a bending state of a flexible display device having a bendable display panel including a plurality of scanning lines, a plurality of data lines, and a plurality of pixel circuits each having a light emitting element and a drive element, the method including steps of: selecting the pixel circuits by driving the scanning lines; performing, by driving the data lines, an operation of writing a voltage to a control terminal of the drive element and an operation of measuring a current flowing through the drive element for the pixel circuits selected using the scanning lines; and detecting a bending state of the display panel based on a measurement result of the current flowing through the drive element.

Effects of the Invention

According to the first or eighteenth aspect of the present invention, since an electrical characteristic of the drive element changes when a screen is bent, the bending state of the screen can be detected based on the measurement result of the current flowing through the drive element. Furthermore, a change in brightness or color when the screen is bent can be prevented by correcting a video signal based on the detected bending state.

According to the second aspect of the present invention, the measurement pixel circuits are provided separately from the display pixel circuits, and the bending state of the screen can be detected based on the measurement result of the current flowing through the drive element in the measurement pixel circuit.

According to the third aspect of the present invention, the bending state of the screen can be detected without affecting display by arranging the measurement pixel circuits outside the display area in which the display pixel circuits are arranged.

According to the fourth aspect of the present invention, the bending state of the screen can be detected even when the screen is bent in any direction by arranging the measurement pixel circuits along two perpendicular directions.

According to the fifth aspect of the present invention, the bending state of the screen can be detected when the screen is bent in a direction in which the measurement pixel circuits are arranged by arranging the measurement pixel circuits along one direction.

According to the sixth or seventh aspect of the present invention, the bending state of the screen can be detected with high accuracy by arranging the display pixel circuits and the measurement pixel circuits in different manners (different intervals).

According to the eighth aspect of the present invention, a local bending state of the screen can be detected by arranging the display pixel circuits and the measurement pixel circuits in the mixed manner.

According to the ninth aspect of the present invention, problems that occur when two types of pixel circuits are formed in the same layer can be solved by forming the display pixel circuits and the measurement pixel circuits in different layers.

According to the tenth, eleventh or twelfth aspect of the present invention, the bending state of the screen can be detected with high accuracy by making the electrical characteristic (size, type) of the drive element different between the display pixel circuit and the measurement pixel circuit.

According to the thirteenth aspect of the present invention, the change in brightness or color when the screen is bent can be prevented by correcting the video signal based on the detected bending state.

According to the fourteenth aspect of the present invention, the change in brightness or color when the screen is bent can be prevented by correcting the video signal to compensate for the change of the amount of the current flowing through the drive element, the change caused by bending.

According to the fifteenth aspect of the present invention, the curvature of the display panel can be detected by referring to the first table, and the correction amount of the electrical characteristic of the drive element can be obtained using the second table. Therefore, the video signal can be corrected based on the obtained correction amount, and the change in brightness or color when the screen is bent can be prevented.

According to the sixteenth aspect of the present invention, the bending state of the display panel can be detected, by estimating the electrical characteristic of the drive element when the display panel is not bent based on the electrical characteristic of the light emitting element and comparing the obtained electrical characteristic of the drive element and the estimated electrical characteristic of the drive element. Therefore, the video signal can be corrected based on the detected bending state, and the change in brightness or color when the screen is bent can be prevented.

According to the seventeenth aspect of the present invention, the change in brightness or color when the screen is bent can be hidden by correcting the video signal so as not to display the bent portion.

BRIEF DESCRIPTION OF THE DRAWINGS

FIG. 17 is a diagram showing an operation of a bending detection unit and a correction unit in a display device according to an embodiment of the present invention.

FIG. 18 is a diagram showing electrical characteristics of drive elements in pixel circuits of an organic EL display device according to the fifth embodiment of the present invention.

FIG. 19 is a diagram showing an operation of a correction unit and a bending detection unit in a display device according to another embodiment of the present invention.

MODES FOR CARRYING OUT THE INVENTION

First Embodiment

Figure 1:
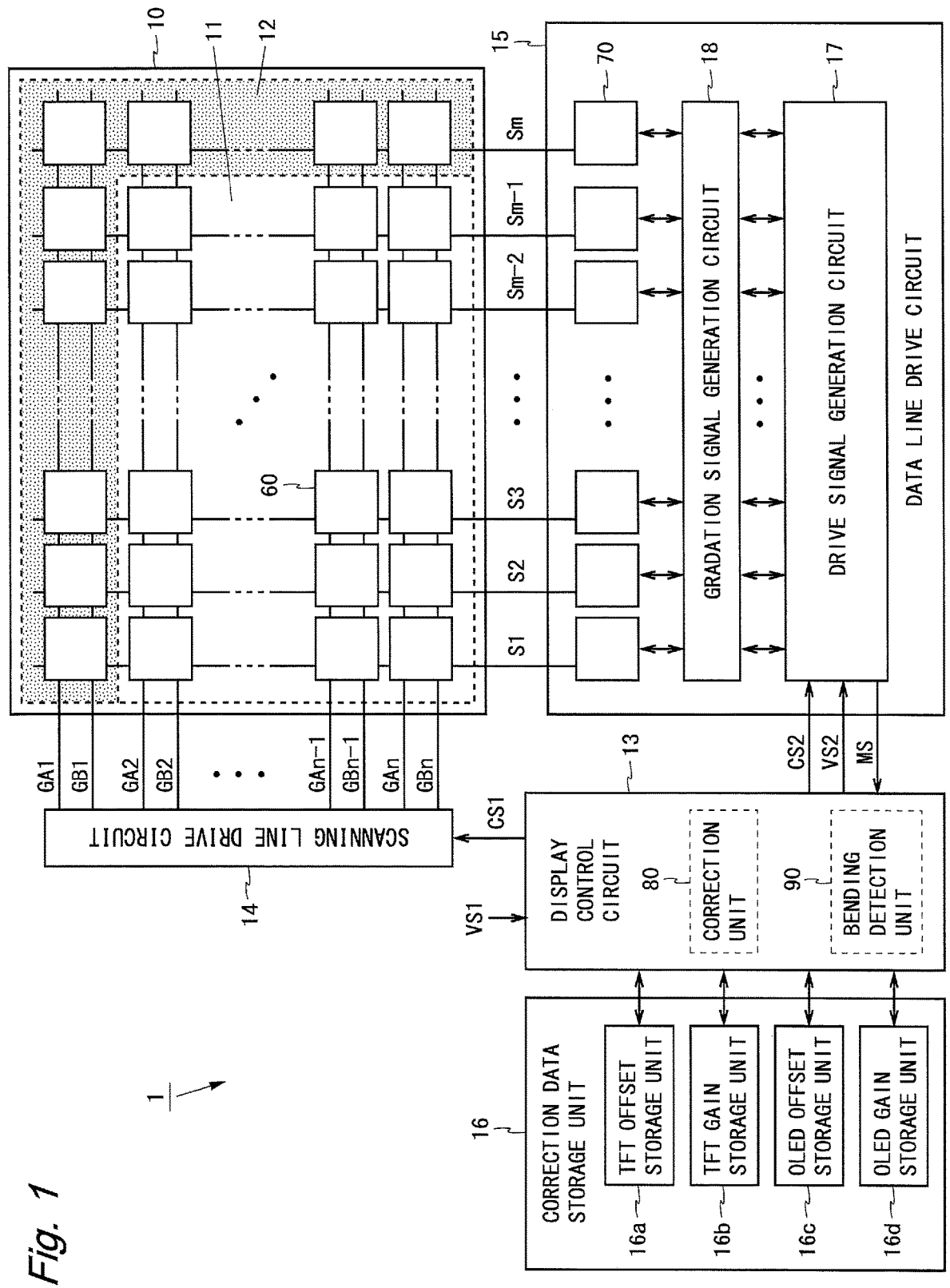
FIG. 1 is a block diagram showing a configuration of an organic EL display device according to a first embodiment of the present invention.

FIG. 1 is a block diagram showing a configuration of an organic EL display device according to a first embodiment of the present invention. An organic EL display device 1 shown in FIG. 1 includes an organic EL panel 10, a display control circuit 13, a scanning line drive circuit 14, a data line drive circuit 15, and a correction data storage unit 16. The organic EL display device 1 is a flexible display device having a bendable screen and has a function of detecting a bending state of the screen. Hereinafter, it is assumed that m and n are integers not less than 2, i is an integer not less than 1 and not more than n, and j is an integer not less than 1 and not more than m.

As shown in FIG. 1, the organic EL panel 10 includes 2n scanning lines GA1 to GAn, GB1 to GBn, m data lines S1 to Sm, and (m=n) pixel circuits 60. The scanning lines GA1 to GAn, GB1 to GBn are arranged in parallel with each other. The data lines S1 to Sm are arranged in parallel with each other so as to intersect with the scanning lines GA1 to GAn, GB1 to GBn perpendicularly. The scanning lines GA1 to GAn and the data lines S1 to Sm intersect at (m=n) positions. The (m=n) pixel circuits 60 are arranged corresponding to (m=n) intersections. Each pixel circuit 60 is connected to one scanning line and one data line. Hereinafter, an extending direction of the scanning lines GA1 to GAn, GB1 to GBn is referred to as a row direction, and an extending direction of the data lines S1 to Sm is referred to as a column direction.

The display control circuit 13 is a control circuit of the organic EL display device 1, and includes a correction unit 80 and a bending detection unit 90. To the display control circuit 13, a video signal VS1 is input from an outside of the organic EL display device 1. The display control circuit 13 outputs a control signal CS1 to the scanning line drive circuit 14 and outputs a control signal CS2 and a video signal VS2 to the data line drive circuit 15. The control signal CS1 includes, for example, a gate start pulse, a gate clock, and the like. The control signal CS2 includes, for example, a source start pulse, a source clock, and the like. The video signal VS2 is obtained by performing a correction processing on the video signal VS1 in the correction unit 80. Details of the correction unit 80 and the bending detection unit 90 will be described later.

The scanning line drive circuit 14 selects the pixel circuits 60 by driving the scanning lines GA1 to GAn, GB1 to GBn. More specifically, the scanning line drive circuit 14 selects one scanning line from among the scanning lines GA1 to GAn based on the control signal CS1, and applies an ON level voltage (here, a high-level voltage) to the selected scanning line. With this, m pixel circuits 60 connected to the selected scanning line are selected collectively. The data line drive circuit 15 drives the data lines S1 to Sm based on the control signal CS2 and the video signal VS2. More specifically, the data line drive circuit 15 applies m voltages in accordance with the video signal VS2 (hereinafter referred to as data voltages) to the data lines S1 to Sm, respectively in accordance with the control signal CS2. With this, them data voltages are written to the selected m pixel circuits 60, respectively.

The data line drive circuit 15 includes a drive signal generation circuit 17, a gradation signal generation circuit 18, and m output/measurement circuits (a combination of an output circuit and a measurement circuit) 70. Each output/measurement circuit 70 corresponds to one of the data lines S1 to Sm. The drive signal generation circuit 17 generates control signals for driving the data lines S1 to Sm. The gradation signal generation circuit 18 generates the data voltages to be applied to the data lines S1 to Sm as gradation signals. The output/measurement circuit 70 has a function of applying the data voltage to the corresponding data line and a function of measuring a current flowing through the corresponding data line. The data voltage applied to the data line is written to a gate terminal of a drive element in the pixel circuit 60. The current flowing through the data line is a current flowing through the drive element in the pixel circuit 60. The data line drive circuit 15 outputs a monitor signal MS indicating a measurement result of the current flowing through the data line (that is, the current flowing through the drive element in the pixel circuit 60) to the display control circuit 13. In this manner, the data line drive circuit 15 performs, by driving the data lines S1 to Sm, an operation of writing a voltage to the gate terminal of the drive element and an operation of measuring the current flowing through the drive element for the pixel circuits 60 selected by the scanning line drive circuit 14.

The correction unit 80 obtains the video signal VS2 by obtaining characteristics of the drive element and an organic EL element in the pixel circuit 60 based on the monitor signal MS and correcting the video signal VS1 using the obtained characteristics. The correction data storage unit 16 is a working memory of the correction unit 80. The correction data storage unit 16 includes a TFT offset storage unit 16a, a TFT gain storage unit 16b, an OLED offset storage unit 16c, and an OLED gain storage unit 16d. The TFT offset storage unit 16a stores a threshold voltage of the drive element for each pixel circuit 60. The TFT gain storage unit 16b stores a gain of the drive element for each pixel circuit 60. The OLED offset storage unit 16c stores a threshold voltage of the organic EL element for each pixel circuit 60. The OLED gain storage unit 16d stores a gain of the organic EL element for each pixel circuit 60.

Figure 2:
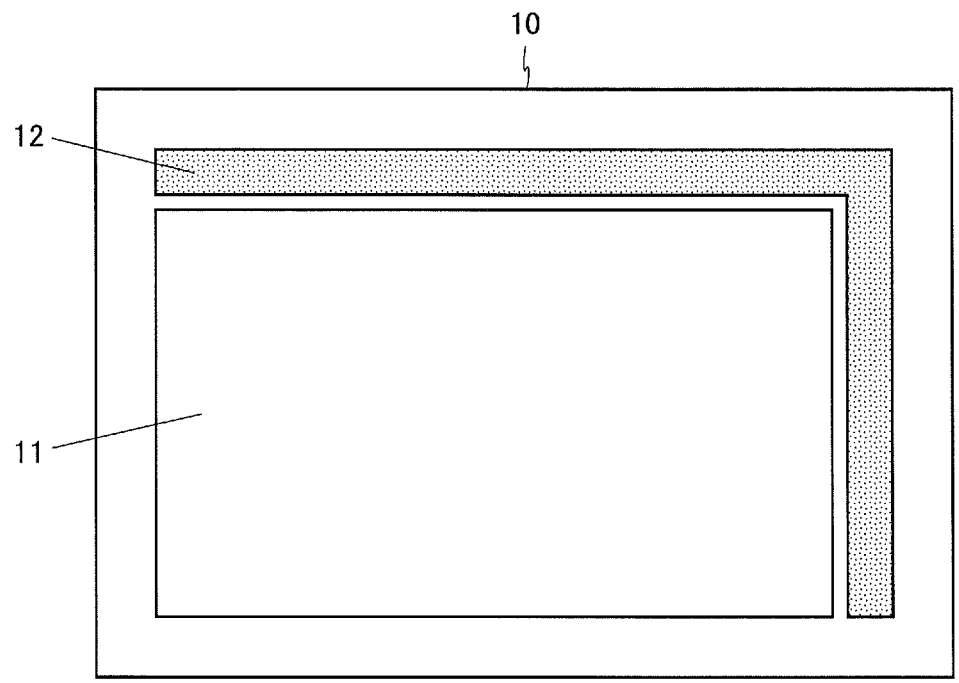
FIG. 2 is a diagram showing a schematic configuration of an organic EL panel of the organic EL display device shown in FIG. 1.

FIG. 2 is a diagram showing a schematic configuration of the organic EL panel 10. As shown in FIG. 2, the organic EL panel 10 includes a display unit 11 and a detection unit 12. The display unit 11 includes the pixel circuits 60 in second to n-th rows and first to (m−1)-th columns, and the detection unit 12 includes the pixel circuits 60 in a first row or an m-th column (see FIG. 1). The display unit 11 has a rectangular shape, and the detection unit 12 is provided along two adjacent sides (an upper side and a right side in FIG. 2) of the display unit 11.

Hereinafter, the pixel circuit included in the display unit 11 is referred to as a "display pixel circuit", and the pixel circuit included in the detection unit 12 is referred to as a "measurement pixel circuit". The (m×n) pixel circuits 60 are classified into the display pixel circuits and the measurement pixel circuits. In the present embodiment, the display pixel circuits are arranged inside a display area, and the measurement pixel circuits are arranged outside the display area. More specifically, the display area has a rectangular shape, and the measurement pixel circuits are arranged along two adjacent sides of the display area.

Figure 3:
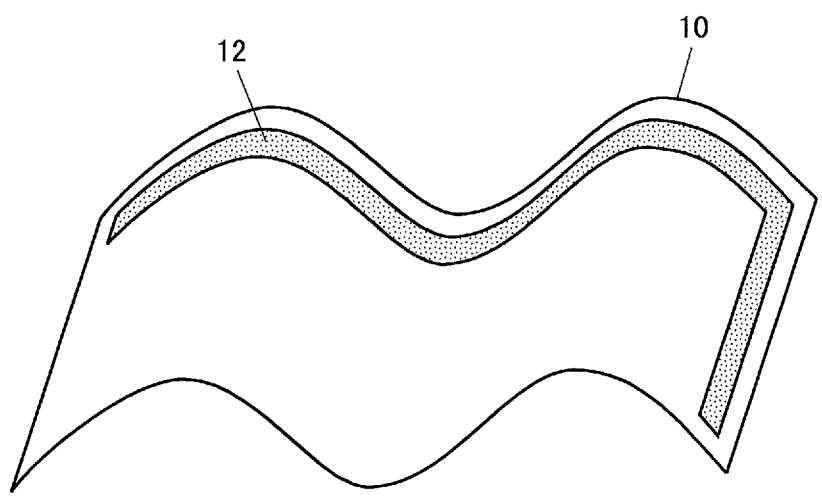
FIG. 3 is a diagram showing the organic EL panel shown in FIG. 2 in a bent state.

The organic EL panel 10 is configured so as to be bendable at an arbitrary position in the row direction and the column direction, by using a plastic substrate or the like. FIG. 3 is a diagram showing the organic EL panel 10 in a bent state. In FIG. 3, the organic EL panel 10 is bent three times in the row direction.

The scanning lines GA1 to GAn, GB1 to GBn, the data lines S1 to Sm, and the (m=n) pixel circuits 60 are formed on the organic EL panel 10 shown in FIG. 1. In addition, all or a part of other circuits included in the organic EL display device 1 (the display control circuit 13, the scanning line drive circuit 14, the data line drive circuit 15, and the correction data storage unit 16) may be formed on the organic EL panel 10. The same holds true for each embodiment described later.

Figure 4:
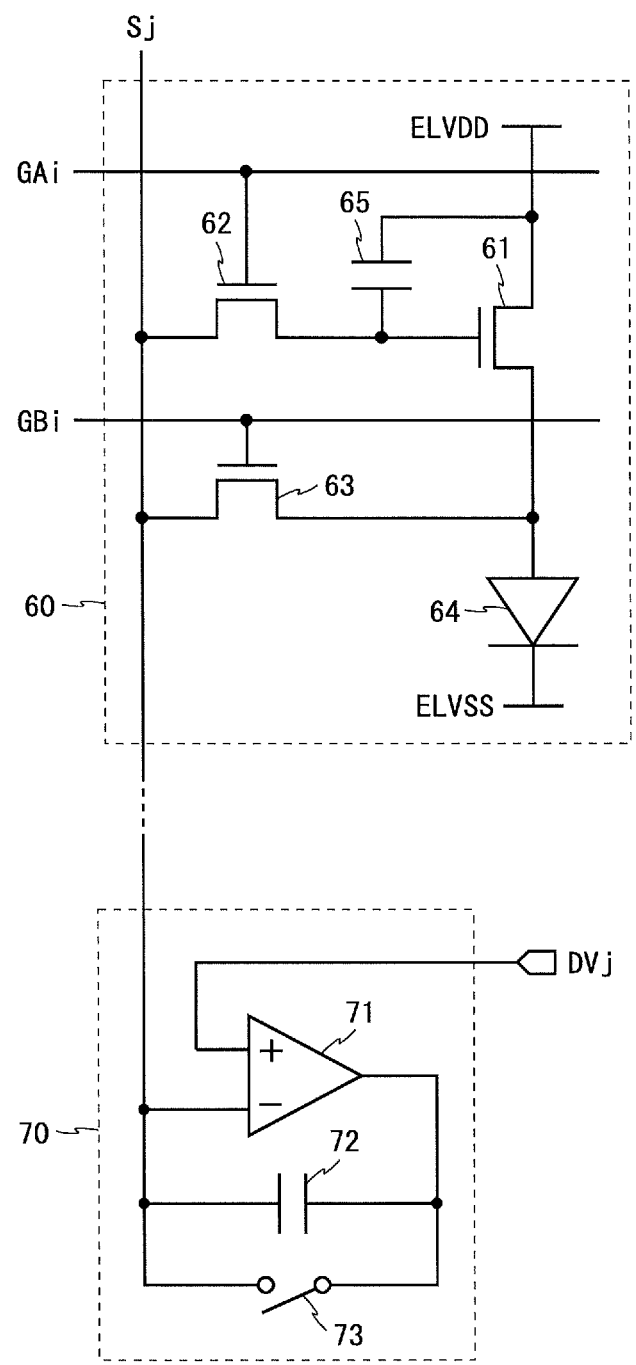
FIG. 4 is a circuit diagram of a pixel circuit and an output/measurement circuit of the organic EL display device shown in FIG. 1.

FIG. 4 is a circuit diagram of the pixel circuit 60 and the output/measurement circuit 70. FIG. 4 describes the pixel circuit 60 in an i-th row and a j-th column and the output/measurement circuit 70 corresponding to a data line Sj. The pixel circuit 60 includes transistors 61 to 63, an organic EL element 64, and a capacitor 65. The transistors 61 to 63 are N-channel type TFTs. A drain terminal of the transistor 61 is connected to a high-level power supply line having a high-level power supply potential ELVDD. A gate terminal of the transistor 61 is connected to one conduction terminal (right-side conduction terminal in FIG. 4) of the transistor 62. A source terminal of the transistor 61 is connected to an anode terminal of the organic EL element 64 and one conduction terminal (right-side conduction terminal in FIG. 4) of the transistor 63. A cathode terminal of the organic EL element 64 is connected to a low-level power supply line having a low-level power supply potential ELVSS. The other conduction terminals of the transistors 62, 63 are connected to the data line Sj. A gate terminal of the transistor 62 is connected to a scanning line GAi, and a gate terminal of the transistor 63 is connected to a scanning line GBi. The capacitor 65 is provided between the drain terminal and the gate terminal of the transistor 61. The transistor 61 functions as a drive element and the organic EL element 64 functions as a light emitting element.

The output/measurement circuit 70 includes an operational amplifier 71, a capacitor 72, and a switch 73. A data voltage DVj output from a D/A conversion circuit (not shown) included in the gradation signal generation circuit 18 is applied to a non-inverting input terminal of the operational amplifier 71. An inverting input terminal of the operational amplifier 71 is connected to the data line Sj. One end of the capacitor 72 is connected to the inverting input terminal of the operational amplifier 71, and the other end of the capacitor 72 is connected to an output terminal of the operational amplifier 71. Similarly, one end of the switch 73 is connected to the inverting input terminal of the operational amplifier 71, and the other end of the switch 73 is connected to the output terminal of the operational amplifier 71. In this manner, the capacitor 72 and the switch 73 are provided in parallel between the inverting input terminal and the output terminal of the operational amplifier 71.

When the switch 73 is in an ON state, the operational amplifier 71 functions as a buffer amplifier. At this time, the non-inverting input terminal and the inverting input terminal of the operational amplifier 71 are short-circuited virtually, and the data voltage DVj applied to the non-inverting input terminal of the operational amplifier 71 is applied to the data line Sj. When the switch 73 is in an OFF state, the operational amplifier 71 and the capacitor 72 function as an integration amplifier. At this time, an output voltage of the operational amplifier 71 changes in accordance with an amount of the current flowing through the data line Sj. In this manner, the output/measurement circuit 70 selectively performs an operation of applying the data voltage to the data line Sj and an operation of measuring the current flowing through the data line Sj, in accordance with a state of the switch 73.

The organic EL display device 1 measures the currents for the pixel circuits 60 in one row in one frame period. Hereinafter, a row for which the currents are measured in a certain frame period is referred to as a measurement target row, and other rows are referred to as normal rows. The measurement target row is switched every frame period. When the i-th row is the normal row, the scanning line drive circuit 14 applies the ON level voltage to the scanning line GAi, and the data line drive circuit 15 applies m data voltages to be written to the pixel circuits 60 in the i-th row, to the data lines S1 to Sm. When the i-th row is the measurement target row, the scanning line drive circuit 14 and the data line drive circuit 15 drive the scanning lines GAi, GBi and the data lines S1 to Sm as shown in FIG. 5.

Figure 5:
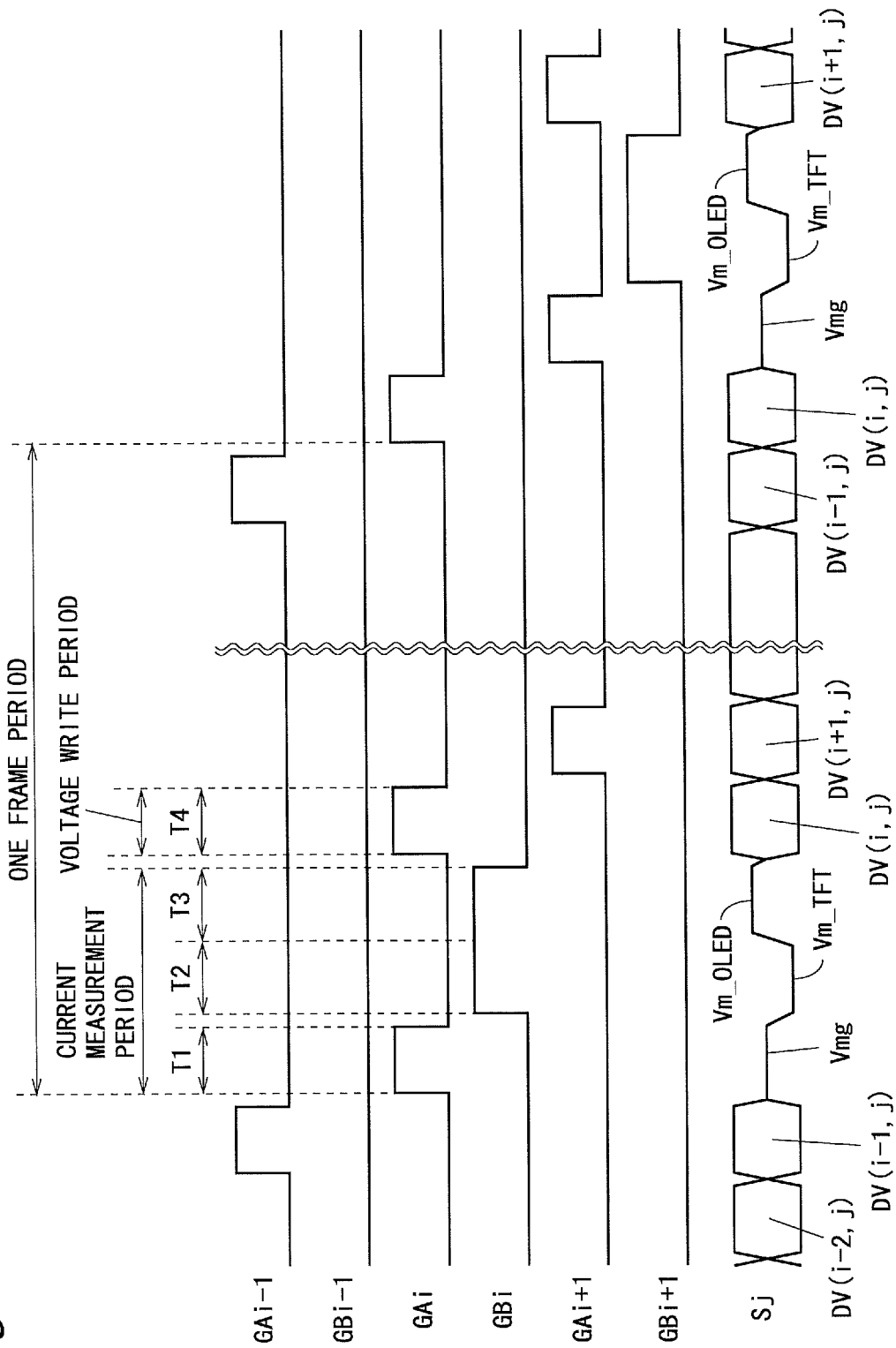
FIG. 5 is a timing chart of the organic EL display device shown in FIG. 1.

FIG. 5 is a timing chart of the organic EL display device 1. FIG. 5 shows changes in voltages potentials of the scanning lines GAi, GBi and the data line Sj in a case where the i-th row is the measurement target row. In FIG. 5, periods T1 to T3 constitute a current measurement period of the pixel circuits 60 in the i-th row, and a period T4 is a voltage write period after the current measurement period of the pixel circuits 60 in the i-th row. FIG. 6A to 6E are diagrams showing an operation of the circuit shown in FIG. 4. The operation of the circuit shown in FIG. 4 will be described below with reference to FIG. 5 and FIGS. 6A to 6E.

Before the period T1, the potentials of the scanning lines GAi, GBi are at a low level. At this time, the transistors 62, 63 are in the OFF state (see FIG. 6A). A gate voltage of the transistor 61 is kept at a data voltage prev_DV(i,j) written previously, by an action of the capacitor 65. The transistor 61 is in the ON state, and a current Ip in accordance with a gate-source voltage of the transistor 61 flows through the transistor 61 and the organic EL element 64. The organic EL element 64 emits light at a brightness in accordance with the previous data voltage prev_DV(i,j).

In the period T1, the potential of the scanning line GAi becomes a high level. Thus, the transistor 62 becomes the ON state (see FIG. 6B). Furthermore, in the period T1, the switch 73 becomes the ON state, and a reference voltage Vmg is applied to the non-inverting input terminal of the operational amplifier 71. Since the operational amplifier 71 functions as the buffer amplifier, the reference voltage Vmg is applied to the data line Sj and the gate voltage of the transistor 61 becomes Vmg.

In the period T2, the potential of the scanning line GAi becomes the low level and the potential of the scanning line GBi becomes the high level. Thus, the transistor 62 becomes the OFF state and the transistor 63 becomes the ON state (see FIG. 6C). Furthermore, in the period T2, the switch 73 becomes the OFF state, and a first measurement voltage Vm_TFT for obtaining characteristics of the transistor 61 is applied to the non-inverting input terminal of the operational amplifier 71. The first measurement voltage Vm_TFT is determined so that a current Ia flows from the high-level power supply line via the transistor 61 and the transistor 63 to the output/measurement circuit 70 at this time. The operational amplifier 71 and the capacitor 72 function as the integration amplifier, and the operational amplifier 71 outputs a voltage Vma in accordance with the current Ia. The current Ia flowing through the transistor 61 in the period T2 can be measured by converting the voltage Vma to a current value.

Figure 6A:
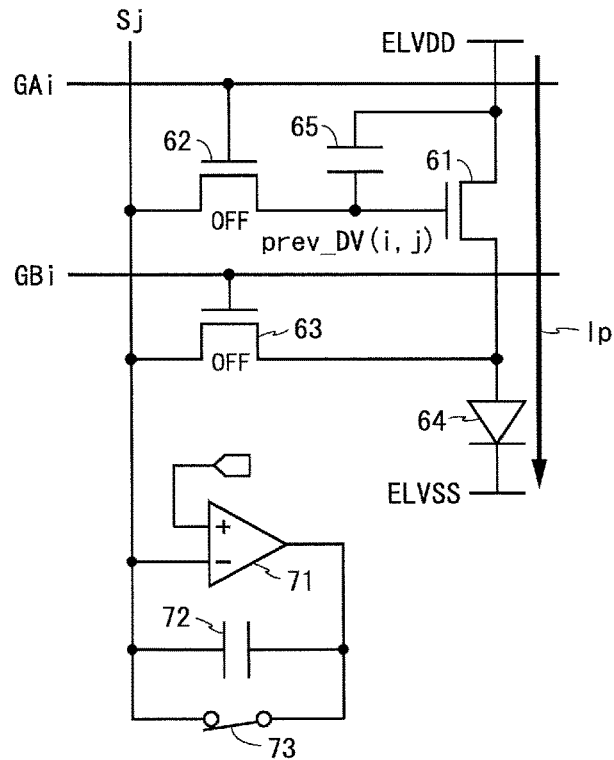
FIG. 6A is a diagram showing an operation of the circuit shown in FIG. 4.
Figure 6B:
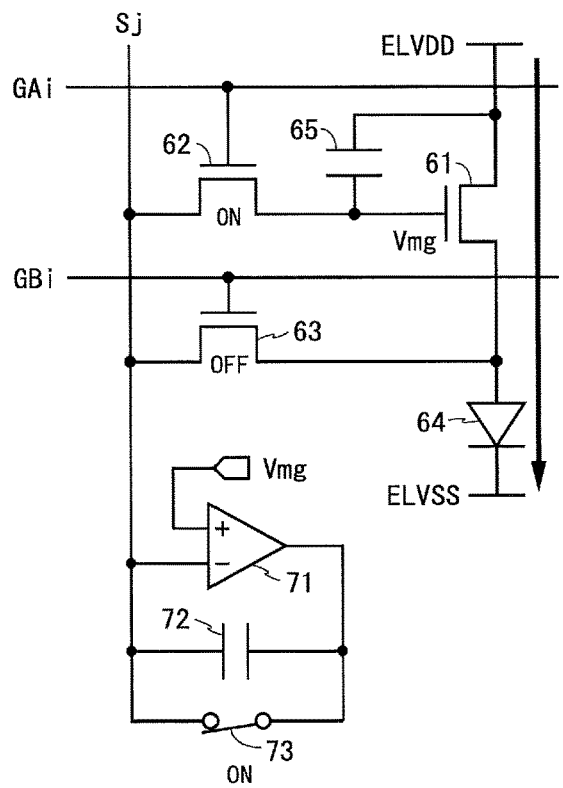
FIG. 6B is a diagram showing the operation of the circuit shown in FIG. 4.
Figure 6C:
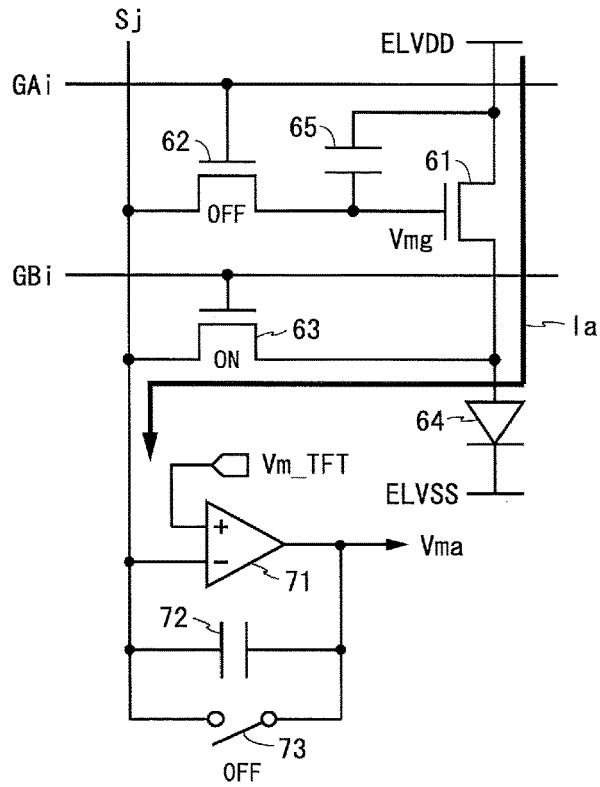
FIG. 6C is a diagram showing the operation of the circuit shown in FIG. 4.
Figure 6D:
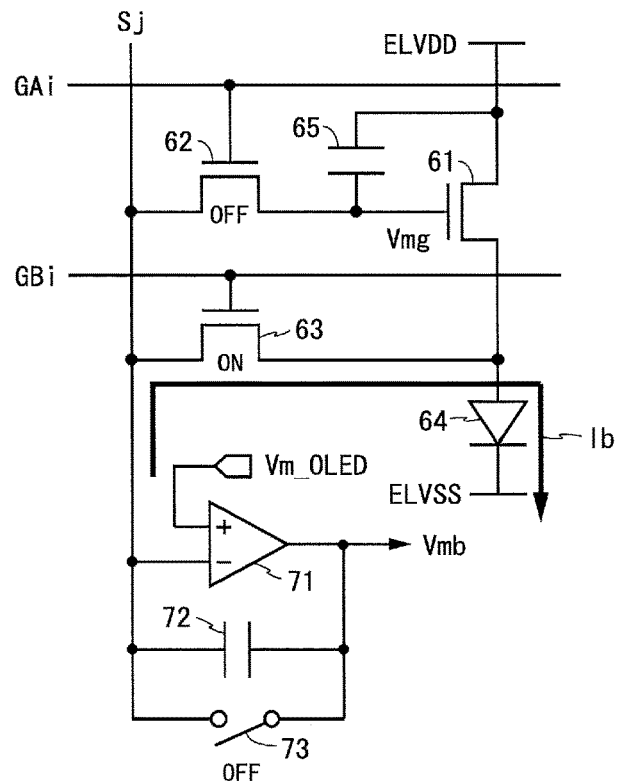
FIG. 6D is a diagram showing the operation of the circuit shown in FIG. 4.
Figure 6E:
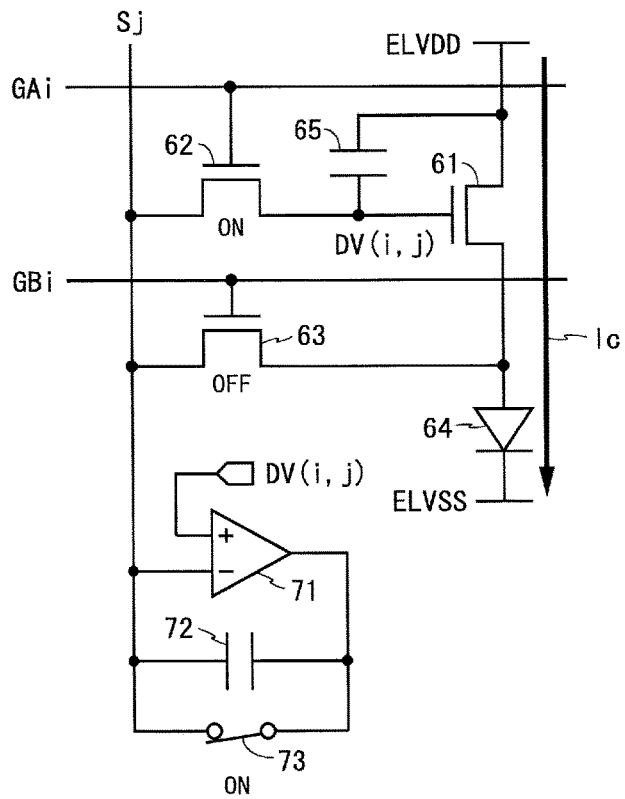
FIG. 6E is a diagram showing the operation of the circuit shown in FIG. 4.

In the period T3, a second measurement voltage Vm_OLED for obtaining characteristics of the organic EL element 64 is applied to the non-inverting input terminal of the operational amplifier 71 (see FIG. 6D). The second measurement voltage Vm_OLED is determined so that a current Ib flows from the output/measurement circuit 70 through the transistor 63 and the organic EL element 64 to the low-level power supply line at this time. The operational amplifier 71 and the capacitor 72 function as the integration amplifier, and the operational amplifier 71 outputs a voltage Vmb in accordance with the current Ib. The current Ib flowing through the organic EL element 64 in the period T3 can be measured by converting the voltage Vmb to a current value.

In the period T4, the potential of the scanning line GAi becomes the high level and the potential of the scanning line GBi becomes the low level. Thus, the transistor 62 becomes the ON state and the transistor 63 becomes the OFF state (see FIG. 6E). Furthermore, in the period T4, the switch 73 becomes the ON state, and a new data voltage DV(i,j) is applied to the non-inverting input terminal of the operational amplifier 71. Since the operational amplifier 71 functions as the buffer amplifier, the data voltage DV(i,j) is applied to the data line Sj and the gate voltage of the transistor 62 becomes DV(i,j).

After the period T4, the potentials of the scanning lines GAi, GBi become the low level. Therefore, as before the period T1, a current Ic in accordance with the gate-source voltage of the transistor 61 flows through the organic EL element 64. The organic EL element 64 emits light at a brightness in accordance with the data voltage DV(i,j) written in the period T4.

In the period T2, when the reference voltage Vmg is applied to the gate terminal of the transistor 61 and the first measurement voltage Vm_TFT is applied to the source terminal of the transistor 61, the current Ia flowing through the transistor 61 is measured. In the period T3, when the second measurement voltage Vm_OLED is applied to the anode terminal of the organic EL element 64, the current Ib flowing through the organic EL element 64 is measured.

In the timing chart shown in FIG. 5, the voltage write period T4 is provided after the current measurement period T1 to T3, and the organic EL element 64 emits light after the period T4. Alternatively, a black write period may be provided after the current measurement period T1 to T3, and the organic EL element 64 may not emit light after the period T4.

Hereinafter, the correction unit 80 will be described. As described above, the data line drive circuit 15 outputs the monitor signal MS indicating the measurement result of the current flowing through the data line, to the display control circuit 13. The correction unit 80 obtains the threshold voltage and the gain of the transistor 61 for each pixel circuit 60 based on the measurement result of the current Ia flowing through the transistor 61 (specifically, a result of converting a measurement result of the output voltage Vma of the operational amplifier 71 in the period T2, to the current value). The obtained threshold voltage and gain are stored in the TFT offset storage unit 16a and the TFT gain storage unit 16b, respectively. Furthermore, the correction unit 80 obtains the threshold voltage and the gain of the organic EL element 64 for each pixel circuit 60 based on the measurement result of the current Ib flowing through the organic EL element 64 (specifically, a result of converting a measurement result of the output voltage Vmb of the operational amplifier 71 in the period T3, to a current value). The obtained threshold voltage and gain are stored in the OLED offset storage unit 16c and the OLED gain storage unit 16d, respectively.

The correction unit 80 may obtain the threshold voltage and the gain of the transistor 61 by an arbitrary method based on the measurement result of the current Ia, and may obtain the threshold voltage and the gain of the organic EL element 64 by an arbitrary method based on the measurement result of the current Ib. For example, the correction unit 80 may measure the current Ia when a relatively low first measurement voltage is applied and the current Ia when a relatively high first measurement voltage is applied for each pixel circuit 60, and may obtain the threshold voltage and the gain of the transistor 61 by solving an equation in which the threshold voltage and the gain are unknown. Alternatively, for each pixel circuit 60, the correction unit 80 may update the threshold voltage of the transistor 61 stored in the TFT offset storage unit 16a in accordance with a comparison result between the measurement result of the current Ia when the relatively low first measurement voltage is applied and an ideal value of the current Ia, and may update the gain of the transistor 61 stored in the TFT gain storage unit 16b in accordance with a comparison result between the measurement result of the current Ia when the relatively high first measurement voltage is applied and the ideal value of the current Ia.

Figure 7:
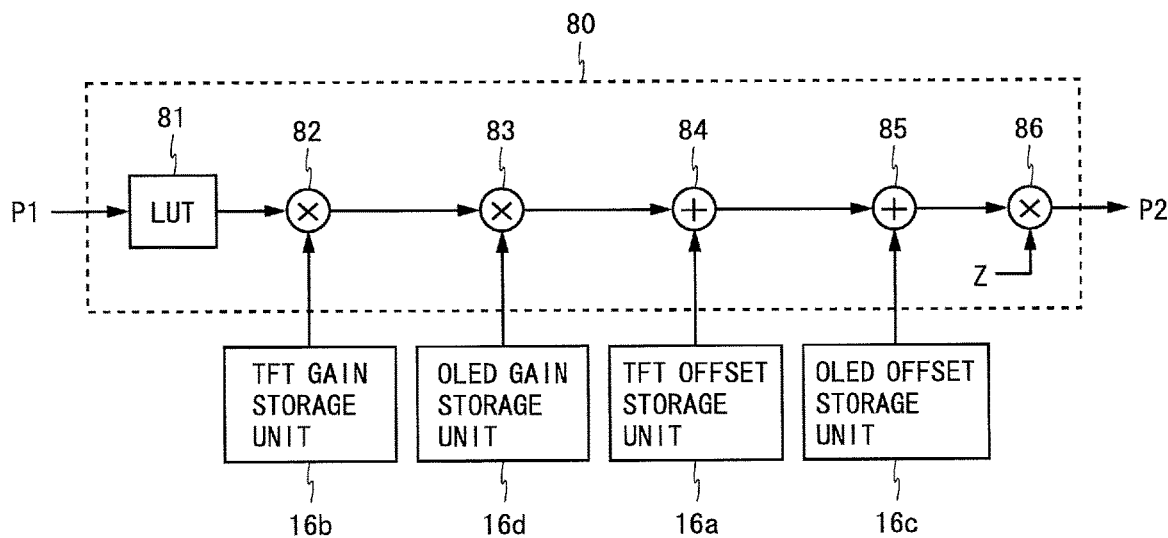
FIG. 7 is a diagram for explaining a correction processing in a correction unit of the organic EL display device shown in FIG. 1.

FIG. 7 is a diagram for explaining a correction processing in the correction unit 80. As shown in FIG. 7, the correction unit 80 includes a lookup table (hereinafter referred to as a LUT) 81, multipliers 82, 83, 86, and adders 84, 85. Hereinafter, a processing on a gradation data P1 of a certain pixel included in the video signal VS1 will be described. Here, the pixel circuit corresponding to this pixel is referred to as PX.

The LUT 81 performs a gamma correction on the gradation data P1. The multiplier 82 multiplies the gradation data after the gamma correction by the gain of the transistor 61 in the pixel circuit PX, the gain read out from the TFT gain storage unit 16b. The multiplier 83 multiplies an output of the multiplier 82 by the gain of the organic EL element 64 in the pixel circuit PX, the gain read from the OLED gain storage unit 16d. The adder 84 adds, to an output of the multiplier 83, the threshold voltage of the transistor 61 in the pixel circuit PX, the threshold voltage read from the TFT offset storage unit 16a. The adder 85 adds, to an output of the adder 84, the threshold voltage of the organic EL element 64 in the pixel circuit PX, the threshold voltage read from the OLED offset storage unit 16c. The multiplier 86 multiplies an output of the adder 85 by a coefficient Z for compensating for an attenuation of the data voltage. An output of the multiplier 86 becomes a corrected gradation data P2 subjected to the correction processing on the gradation data P1. The video signal VS2 output from the display control circuit 13 includes the corrected gradation data P2.

Hereinafter, the bending detection unit 90 will be described. As described above, the correction unit 80 obtains the threshold voltage and the gain of the transistor 61 for the pixel circuit 60 included in the organic EL panel 10. This processing is performed not only for the display pixel circuits included in the display unit 11 but also for the measurement pixel circuits included in the detection unit 12. When the organic EL panel 10 is bent, a channel region (a region where drain/source electrodes and a gate electrode overlap in a planer view) of the transistor 61 in the measurement pixel circuit is deformed. Accordingly, electrical characteristics (threshold voltage and I-V characteristic) of the transistor 61 in the measurement pixel circuit change, and the amount of the current flowing through the transistor 61 in the measurement pixel circuit changes. Thus, the bending detection unit 90 detects a bending state of the organic EL panel 10 based on a change in the amount of the current flowing through the transistor 61 in the measurement pixel circuit.

The bending detection unit 90 stores an initial value Vth0 of the threshold voltage and an initial value $\beta 0$ of the gain of the transistor 61 for each measurement pixel circuit. Here, the initial value means a value obtained at first after a power is supplied to the organic EL display device 1. When the correction unit 80 obtains the threshold voltage Vth and the gain $\beta$ of the transistor 61 in the measurement pixel circuit, the correction unit 80 outputs these values to the bending detection unit 90. The bending detection unit 90 calculates a difference $\Delta$Vth (=Vth−Vth0) between the initial value Vth0 of the threshold voltage and the newly obtained threshold voltage Vth, and a difference $\Delta\beta$ (=$\beta$-$\beta 0$) between the initial value $\beta 0$ of the gain and the newly obtained gain. Based on the obtained differences $\Delta$Vth, $\Delta\beta$, the bending detection unit 90 obtains the bending state of the organic EL panel 10 at a position of the measurement pixel circuit. The bending detection unit 90 may determine whether the organic EL panel 10 is bent, may obtain a value indicating a degree of bending of the organic EL panel 10 in a stepwise manner, or may obtain a bending amount as a numerical value. The bending detection unit 90 outputs the detected bending state to the correction unit 80.

The correction unit 80 corrects the video signal VS1 based on the bending state detected by the bending detection unit 90. More specifically, based on the bending state detected by the bending detection unit 90, the correction unit 80 corrects the video signal VS1 so as to compensate for a change of the amount of the current flowing through the transistor 61 in the display pixel circuit, the change caused by bending. For example, the bending detection unit 90 includes a curvature LUT for storing a curvature of the organic EL panel 10 corresponding to a combination of values of the differences $\Delta$Vth, $\Delta\beta$, and obtains the curvature of the organic EL panel 10 at the position of the measurement pixel circuit by referring to the curvature LUT using the obtained differences $\Delta$Vth, $\Delta\beta$. The correction unit 80 includes a correction LUT for storing correction amounts of the threshold voltage and the gain of the transistor 61 corresponding to the curvature, obtains the correction amounts of the threshold voltage and the gain of the transistor 61 by referring to the correction LUT using the curvature obtained by the correction unit 80, and corrects the video signal VS1 using the obtained correction amounts. A change in brightness or color when the screen is bent can be prevented by correcting the video signal VS1 in this manner. Alternatively, the correction unit 80 may correct the video signal VS1 corresponding to a bent portion, to a non-display level (for example, black level) based on the bending state detected by the bending detection unit 90 (see FIG. 17). With this, the change in brightness or color when the screen is bent can be hidden.

The bending state detected by the bending detection unit 90 can be used for other than described above. For example, when the organic EL panel has a touch panel function, the display control circuit may stop the touch panel function when detecting that the organic EL panel is bent.

As described above, the organic EL display device 1 according to the present embodiment includes a bendable display panel (organic EL panel 10) having a plurality of the scanning lines GA1 to GAn, GB1 to GBn, a plurality of the data lines S1 to Sm, and a plurality of the pixel circuits 60 each having the drive element (transistor 61) and the light emitting element (organic EL element 64), the scanning line drive circuit 14 for selecting the pixel circuits 60 by driving the scanning lines GA1 to GAn, GB1 to GBn, the data line drive circuit 15 for performing, by driving the data lines S1 to Sm, an operation of writing a voltage to a control terminal of the drive element (gate terminal of the transistor 61) and an operation of measuring the current flowing through the drive element for the pixel circuit 60 selected by the scanning line drive circuit 14, and the bending detection unit 90 for detecting the bending state of the display panel based on the measurement result of the current Ia flowing through the drive element. According to the organic EL display device 1 according to the present embodiment, since an electrical characteristic of the drive element changes when the screen is bent, the bending state of the screen can be detected based on the measurement result of the current flowing through the drive element.

Furthermore, the pixel circuits 60 are classified into the display pixel circuits (pixel circuits included in the display unit 11) and the measurement pixel circuits (pixel circuits included in the detection unit 12), and the bending detection unit 90 detects the bending state of the display panel based on the measurement result of the current flowing through the drive element in the measurement pixel circuit. In this manner, the measurement pixel circuits are provided separately from the display pixel circuits, and the bending state of the screen can be detected based on the measurement result of the current flowing through the drive element in the measurement pixel circuit. Furthermore, the display pixel circuits are arranged inside the display area, and the measurement pixel circuits are arranged outside the display area. The bending state of the screen can be detected without affecting display by arranging the measurement pixel circuits outside the display area in which the display pixel circuits are arranged in this manner. Furthermore, the display area has the rectangular shape, and the measurement pixel circuits are arranged along two adjacent sides of the display area. With this, the bending state of the screen can be detected even when the screen is bent in any direction.

Furthermore, the organic EL display device 1 includes the correction unit 80 for correcting the video signal VS1 based on the bending state detected by the bending detection unit 90, and the data line drive circuit 15 applies, to the data lines S1 to Sm, voltages based on the video signal VS2 corrected by the correction unit 80. The change in brightness or color when the screen is bent can be prevented by correcting the video signal VS1 based on the detected bending state in this manner. The correction unit 80 may correct the video signal VS1 so as to compensate for the change of the amount of the current flowing through the drive element, the change caused by bending. The change in brightness or color when the screen is bent can be prevented by correcting the video signal to compensate for the change of the amount of the current flowing through the drive element, the change caused by bending. Furthermore, the correction unit 80 may correct the video signal VS1 corresponding to the bent portion, to the non-display level. The change in brightness or color when the screen is bent can be hidden by correcting the video signal VS1 so as to not display the bent portion in this manner.

Figure 8:
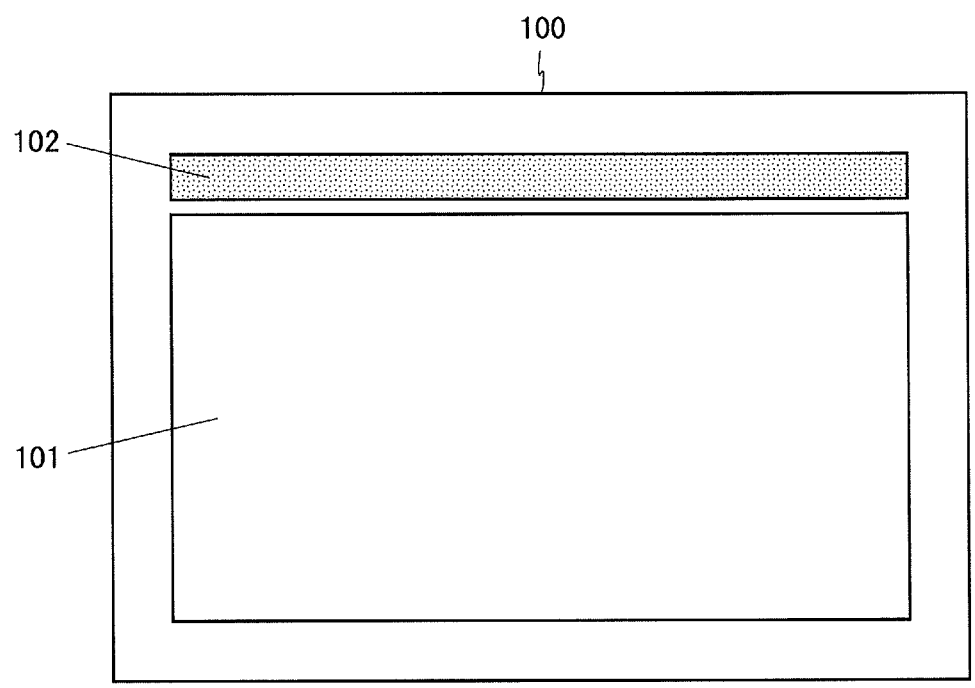
FIG. 8 is a diagram showing a schematic configuration of an organic EL panel of an organic EL display device according to a modification of the first embodiment of the present invention.

In the organic EL display device 1, the measurement pixel circuits are arranged along two sides of the display area. Alternatively, the measurement pixel circuits may be arranged along one side of the display area, as shown in FIG. 8. In an organic EL panel 100 shown in FIG. 8, a display unit 101 has a rectangular shape, and a detection unit 102 is provided along one side (upper side in FIG. 8) of the display unit 101. The display unit 101 includes the pixel circuits in the second to n-th rows, and the detection unit 12 includes the pixel circuits in the first row. The bending state of the screen can be detected when the screen is bent in a direction in which the measurement pixel circuits are arranged by arranging the measurement pixel circuits along one direction in this manner.

Second Embodiment

Figure 9:
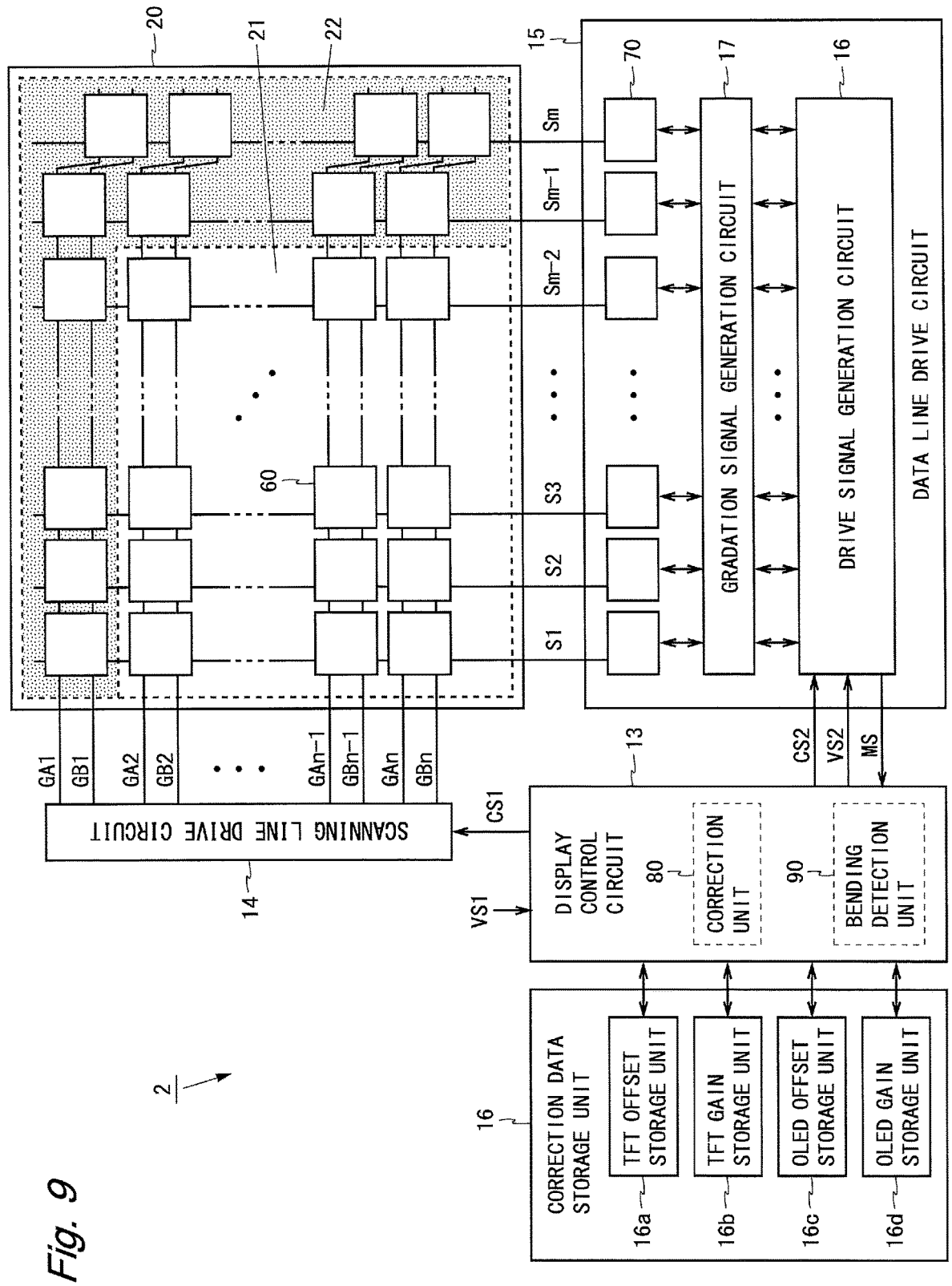
FIG. 9 is a block diagram showing a configuration of an organic EL display device according to a second embodiment of the present invention.

FIG. 9 is a block diagram showing a configuration of an organic EL display device according to a second embodiment of the present invention. An organic EL display device 2 shown in FIG. 9 is obtained by replacing the organic EL panel 10 with an organic EL panel 20, in the organic EL display device 1 according to the first embodiment. Hereinafter, among constituent elements of each embodiment, the same elements as those of the first embodiment are provided with the same reference numerals, and the description thereof will be omitted.

The organic EL panel 20 is different from the organic EL panel 10 in the following points. The organic EL panel 20 has a display unit 21 and a detection unit 22. The display unit 21 includes the pixel circuits 60 in the second to n-th rows and the first to (m−2)-th columns, and the detection unit 22 includes the pixel circuits 60 in the first row or the (m−1)-th to m-th columns. The pixel circuits 60 in the m-th column are arranged at positions shifted by ½ row from the pixel circuits 60 in the (m−1)-th column (positions shifted downward in FIG. 9). In this manner, in the organic EL display device 2, an arrangement manner of the measurement pixel circuits is different from an arrangement manner of the display pixel circuits. Furthermore, an arrangement interval of the measurement pixel circuits is different from an arrangement interval of the display pixel circuits, and is half of the arrangement interval of the display pixel circuits.

In the organic EL display device 1 according to the first embodiment, the measurement pixel circuits are arranged in the same manner as the display pixel circuits. Specifically, in the organic EL display device 1, the measurement pixel circuits are arranged in the same arrangement interval as that of the display pixel circuits to form one column. According to the organic EL display device 1, the bending state of the organic EL panel 10 can be obtained with an accuracy of the arrangement interval of the display pixel circuits.

On the other hand, in the organic EL display device 2, the measurement pixel circuits are arranged to form two columns, and the measurement pixel circuits in two columns are arranged at positions shifted by ½ row of the arrangement interval of the display pixel circuits. Specifically, the pixel circuits 60 in the (m−1)-th column are arranged in the same manner as the display pixel circuits, and the pixel circuits 60 in the m-th column are arranged in positions shifted by ½ row from the display pixel circuits. Therefore, according to the organic EL display device 2, the bending state of the organic EL panel 20 can be obtained with higher accuracy than the organic EL display device 1 (with an accuracy of ½ of the arrangement interval of the display pixel circuits).

As described above, in the organic EL display device 2 according to the present embodiment, the arrangement manner (arrangement interval) of the measurement pixel circuits is different from the arrangement manner of the display pixel circuits. According to the organic EL display device 2, the bending state of the screen can be detected with high accuracy by arranging the display pixel circuits and the measurement pixel circuits in different manners (different intervals).

Note that the organic EL panel 20 includes the measurement pixel circuits in one row and the measurement pixel circuits in two columns. Alternatively, the organic EL panel may include the measurement pixel circuits in any number of rows, or may include the measurement pixel circuits in any number of columns. When the organic EL panel includes the measurement pixel circuits in p rows (p is an integer not less than 2), the measurement pixel circuits in the p rows are arranged at positions shifted by 1/p column for each row. When the organic EL panel includes the measurement pixel circuits in q columns (q is an integer not less than 2), the measurement pixel circuits in the q columns are arranged at positions shifted by 1/q row for each column. As a number of rows or a number of columns of the measurement pixel circuits increases, the bending state of the organic EL panel can be detected with higher accuracy.

Third Embodiment

Figure 10:
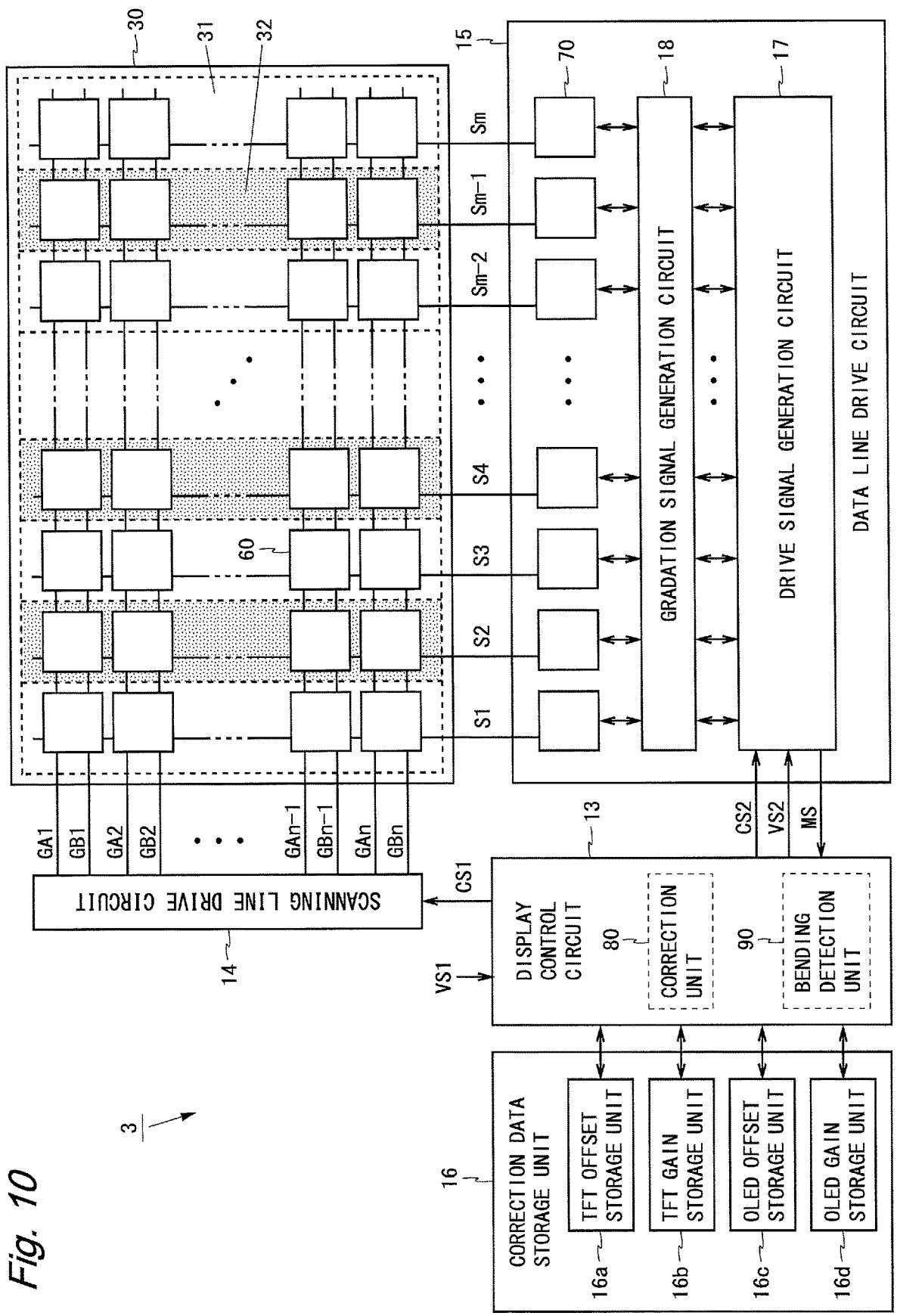
FIG. 10 is a block diagram showing a configuration of an organic EL display device according to a third embodiment of the present invention.

FIG. 10 is a block diagram showing a configuration of an organic EL display device according to a third embodiment of the present invention. An organic EL display device 3 shown in FIG. 10 is obtained by replacing the organic EL panel 10 with an organic EL panel 30, in the organic EL display device 1 according to the first embodiment.

The organic EL panel 30 is different from the organic EL panel 10 in the following points. The organic EL panel 30 has a display unit 31 and a detection unit 32. The display unit 31 includes the pixel circuits 60 in odd-numbered columns, and the detection unit 32 includes the pixel circuits 60 in even-numbered columns. In this manner, in the organic EL display device 3 according to the present embodiment, the display area has a rectangular shape, and the display pixel circuits and the measurement pixel circuits are arranged inside the display area in a mixed manner. In other words, the measurement pixel circuits are arranged inside the display area having the rectangular shape, together with the display pixel circuits. According to the organic EL display device 3, a local bending of the screen can be detected.

In the organic EL panel 30, the display unit 31 including the pixel circuits 60 in one column and the detection unit 32 including the pixel circuits 60 in one column are alternately arranged in the row direction. Alternatively, a display unit including the pixel circuits 60 in an arbitrary number of columns and a detection unit including the pixel circuits 60 in an arbitrary number of columns may be arranged alternately in the row direction. Furthermore, a display unit including the pixel circuits 60 in any number of rows and a detection unit including the pixel circuits 60 in any number of rows may be arranged alternately in the column direction.

Fourth Embodiment

Figure 11:
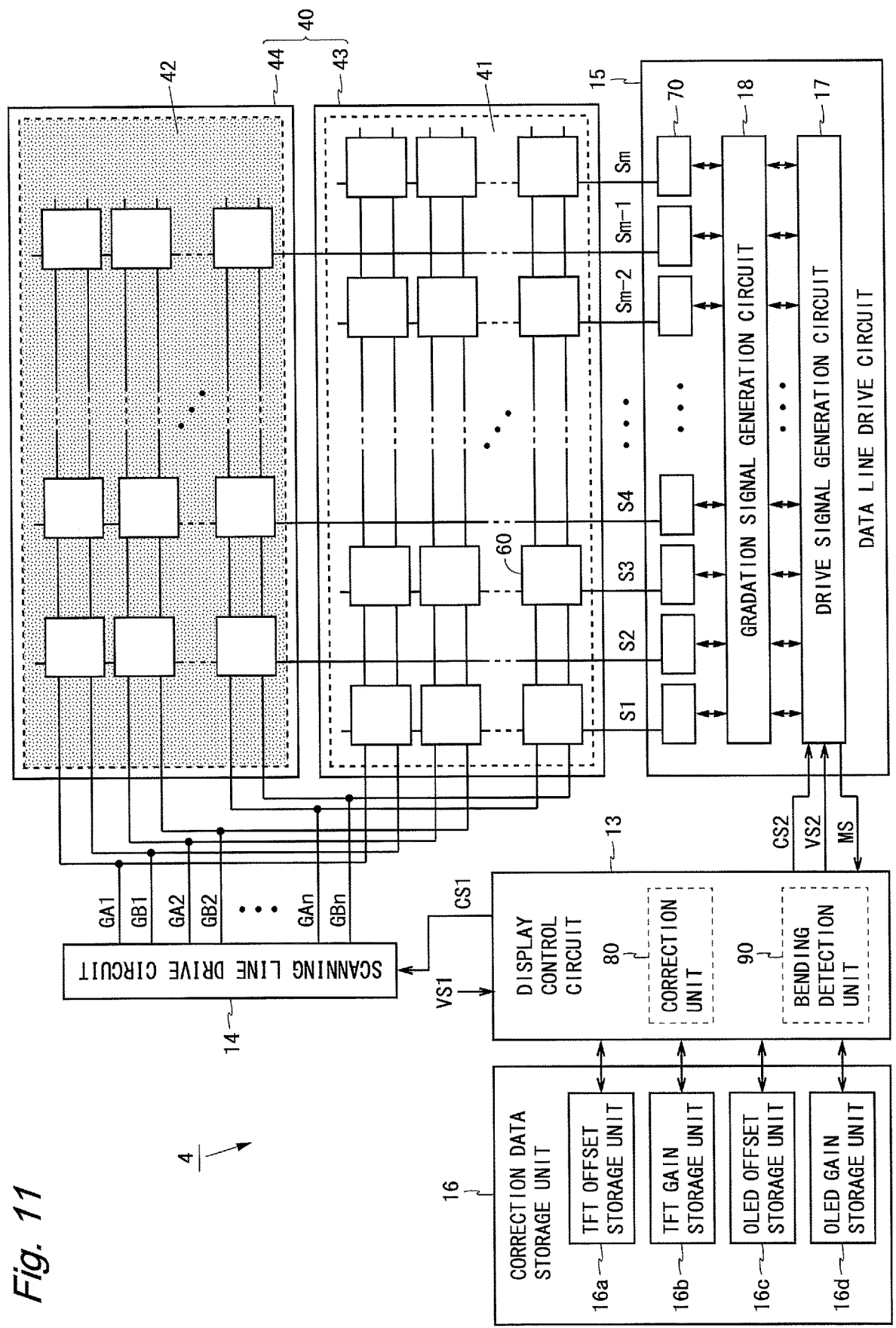
FIG. 11 is a block diagram showing a configuration of an organic EL display device according to a fourth embodiment of the present invention.

FIG. 11 is a block diagram showing a configuration of an organic EL display device according to a fourth embodiment of the present invention. An organic EL display device 4 shown in FIG. 11 is obtained by replacing the organic EL panel 10 with an organic EL panel 40, in the organic EL display device 1 according to the first embodiment.

Figure 12:
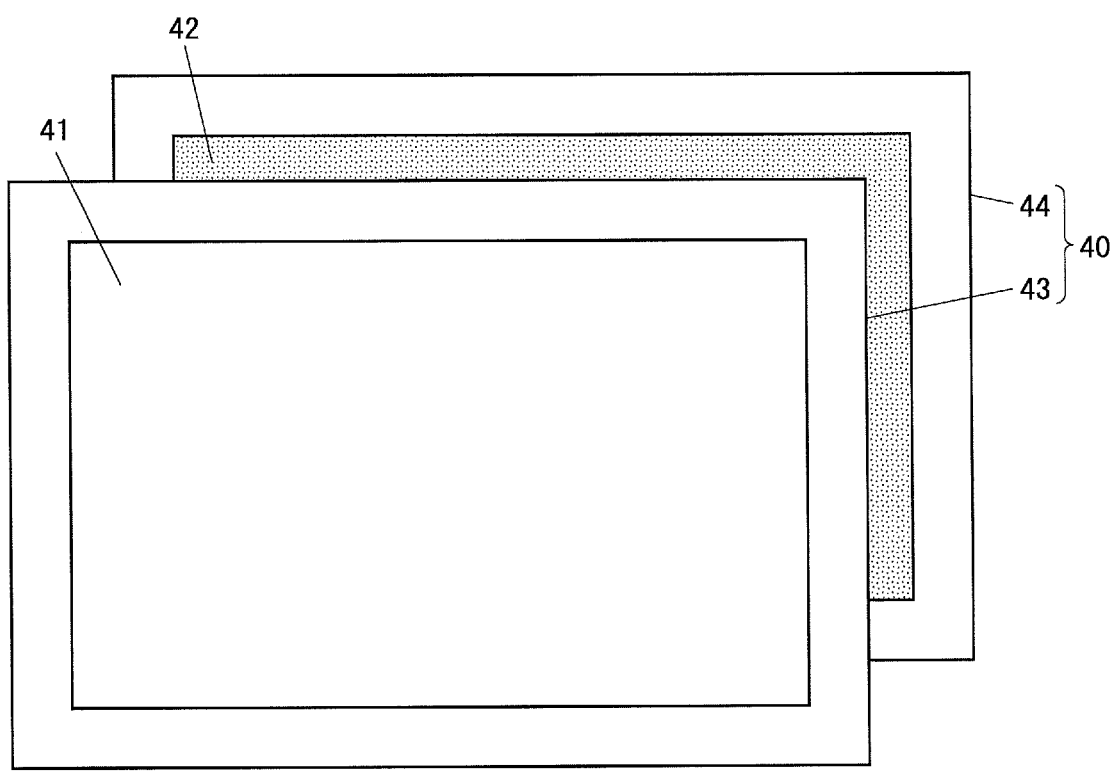
FIG. 12 is a diagram showing a configuration of an organic EL panel of the organic EL display device shown in FIG. 11.

The organic EL panel 40 is different from the organic EL panel 10 in the following points. FIG. 12 is a diagram showing a schematic configuration of the organic EL panel 40. As shown in FIGS. 11 and 12, the organic EL panel 40 has a multi-layer structure (two-layer structure) including a layer in which a display unit 41 is formed (hereinafter referred to as a display layer 43) and a layer in which a detection unit 42 is formed (hereinafter referred to as a detection layer 44). As with the organic EL panel 30, the display unit 41 includes the pixel circuits 60 in the odd-numbered columns, and the detection unit 42 includes the pixel circuits 60 in the even-numbered columns. The display layer 43 and the detection layer 44 are formed separately, and the organic EL panel 40 is formed by pasting the display layer 43 and the detection layer 44 together.

In a case where a size or type of the drive element are made different between the display pixel circuit and the measurement pixel circuit as in a fifth embodiment described later, when two types of pixel circuits are formed in the same layer, problems such as mixing of materials used for forming the pixel circuits may occur. In the organic EL display device 4, since the display pixel circuits and the measurement pixel circuits are formed in different layers, problems that occur when the two types of pixel circuits are formed in the same layer do not occur. Furthermore, when a failure occurs in one layer, by changing only the layer in which the failure occurs, a yield of the organic EL panel 40 can be improved and a cost of the organic EL display device 4 can be reduced.

As described above, in the organic EL display device 4 according to the present embodiment, the display panel (the organic EL panel 40) has a multi-layer structure including a layer in which the display pixel circuits are formed (display layer 43) and a layer in which the measurement pixel circuits are formed (detection layer 44). According to the organic EL display device 4, the problems that occur when the two types of pixel circuits are formed in the same layer can be solved by forming the display pixel circuits and the measurement pixel circuits in different layers.

Fifth Embodiment

An organic EL display device according to a fifth embodiment of the present invention has the same configuration as any one of the organic EL display devices 1 to 4 according to the first to fourth embodiments. The organic EL display device according to the present embodiment has a feature that an electrical characteristic of the drive element in the measurement pixel circuit is different from an electrical characteristic of the drive element in the display pixel circuit.

In the organic EL display device according to the present embodiment, a transistor whose change in an amount of a current is small (more preferably, the amount of the current does not change) when the screen is bent is used for the drive element in the display pixel circuit. On the other hand, a transistor whose change in the amount of the current is large when the screen is bent is used for the drive element in the measurement pixel circuit (see FIG. 18).

For example, as the drive element in the measurement pixel circuit, a transistor having a size different from that of the drive element in the display pixel circuit (a transistor larger than the drive element in the display pixel circuit) may be used. Specifically, as the drive element in the measurement pixel circuit, there may be used a transistor having a shorter channel length than that of the drive element in the display pixel circuit or a transistor having a longer channel width than that of the drive element in the display pixel circuit. Alternatively, as the drive element in the measurement pixel circuit, a transistor (for example, an organic TFT) of a different type from that of the drive element in the display pixel circuit may be used. Specifically, the drive element in the display pixel circuit may be formed using amorphous silicon or crystalline silicon, and the drive element in the measurement pixel circuit may be formed using an oxide semiconductor having a small off-current.

As described above, in the organic EL display device 5 according to the present embodiment, the electrical characteristic (size, type) of the drive element in the measurement pixel circuit is different from the electrical characteristic (size, type) of the drive element in the display pixel circuit. Therefore, the bending state of the screen can be detected with high accuracy.

Sixth Embodiment

Figure 13:
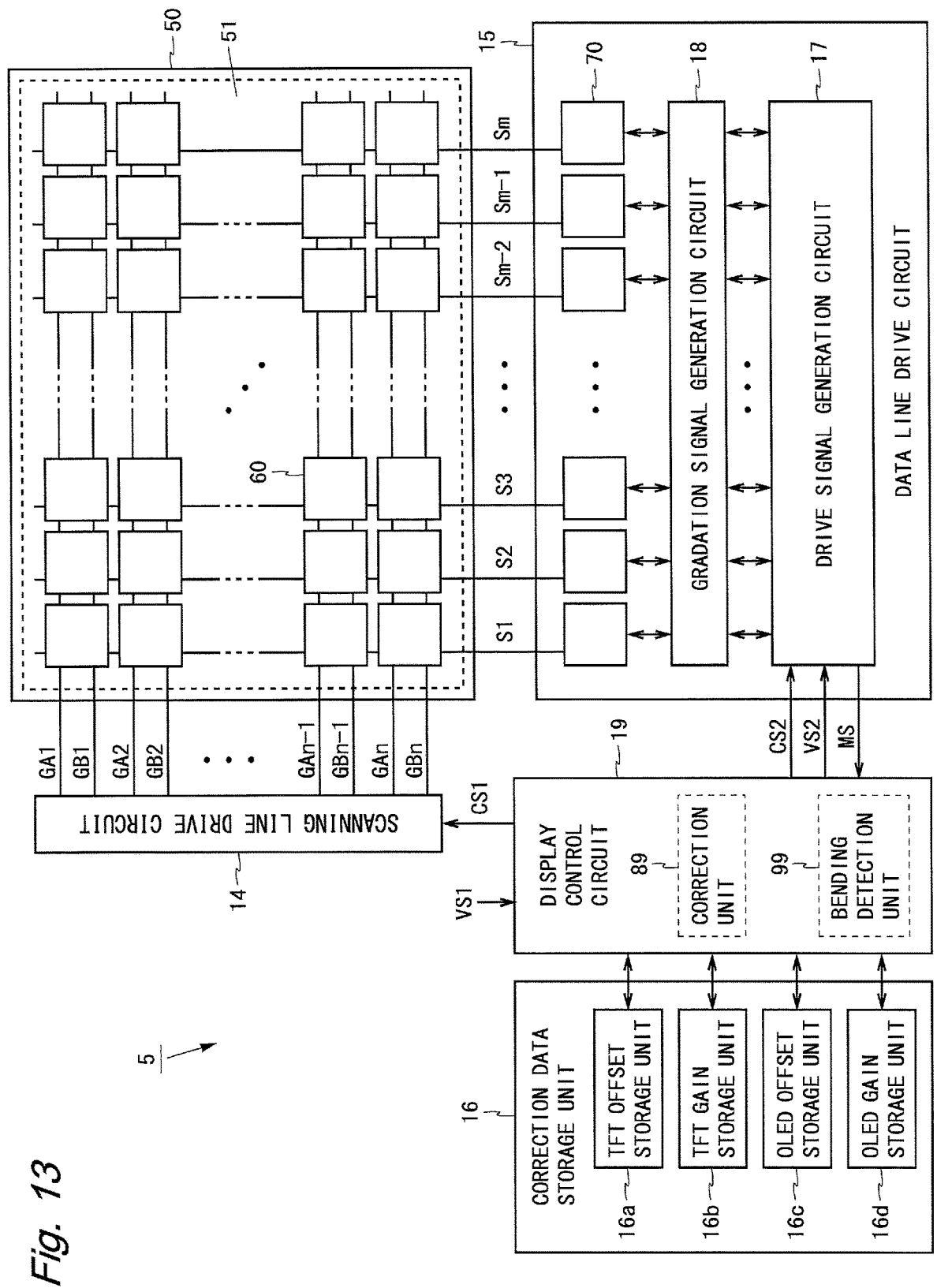
FIG. 13 is a block diagram showing a configuration of an organic EL display device according to a fifth embodiment of the present invention.
Figure 14:
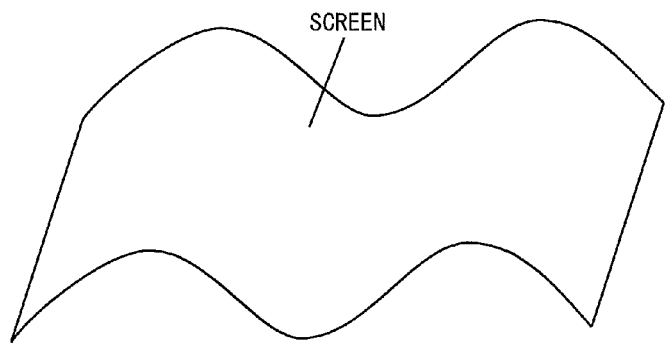
FIG. 14 is a diagram showing a screen of a flexible display device in a bent state.
Figure 15:
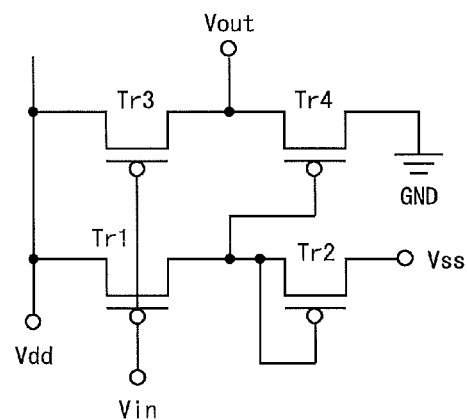
FIG. 15 is a circuit diagram of a complementary type circuit included in a conventional sensor device.
Figure 16:
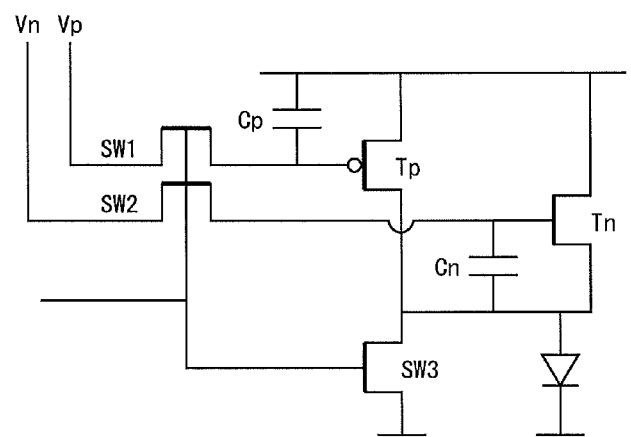
FIG. 16 is a circuit diagram of a pixel circuit included in a conventional display device.

FIG. 13 is a block diagram showing a configuration of an organic EL display device according to a sixth embodiment of the present invention. An organic EL display device 5 shown in FIG. 13 is obtained by respectively replacing the organic EL panel 10 and the display control circuit 13 with an organic EL panel 50 and a display control circuit 19, in the organic EL display device 1 according to the first embodiment. The display control circuit 19 is obtained by respectively replacing the correction unit 80 and the bending detection unit 90 with a correction unit 89 and a bending detection unit 99, in the display control circuit 13.

The organic EL panel 50 is different from the organic EL panel 10 in that it has a display unit 51 and does not have a detection unit. The display unit 51 includes all of the pixel circuits 60 included in the organic EL panel 50.

The correction unit 89 obtains the threshold voltage and the gain of the transistor 61 for each display pixel circuit. The bending detection unit 99 stores the initial value Vth0 of the threshold voltage and the initial value β0 of the gain of the transistor 61 for each display pixel circuit. When the correction unit 89 obtains the threshold voltage Vth and the gain β of the transistor 61 in the display pixel circuit, the correction unit 89 outputs these values to the bending detection unit 99. The bending detection unit 99 obtains the difference ΔVth between the initial value Vth0 of the threshold voltage and the newly obtained threshold voltage Vth and the difference Δβ between the initial value β0 of the gain and the newly obtained gain β. The bending detection unit 99 obtains the bending state of the organic EL panel 50 at a position of the display pixel circuit when the obtained differences ΔVth, Δβ are large. As with the correction unit 80 according to the first embodiment, the correction unit 89 corrects the video signal VS1 based on the bending state detected by the bending detection unit 90.

Alternatively, the correction unit 89 may obtain an electrical characteristic of the transistor 61 (hereinafter referred to as a first characteristic) and an electrical characteristic of the organic EL element 64 (hereinafter referred to as a second characteristic), and the bending detection unit 99 may detect the bending state of the organic EL panel 50 by estimating the electrical characteristic of the transistor 61 when the organic EL panel 50 is not bent (hereinafter referred to as a third characteristic) based on the second characteristic and comparing the first characteristic and the third characteristic (see FIG. 19).

Specifically, in addition to the above-described curvature LUT, the bending detection unit 99 includes two types of aging LUTs (an aging LUT for the transistor and an aging LUT for the organic EL element). The aging LUT for the organic EL element stores aging time corresponding to the output voltage Vmb of the operational amplifier 71 in the period T3. The aging LUT for the transistor stores the threshold voltage and the gain of the transistor corresponding to the aging time. First, the bending detection unit 99 obtains the aging time by referring to the aging LUT for the organic EL element using the voltage Vmb measured in the period T3. Next, the bending detection unit 99 estimates the threshold voltage and the gain of the transistor 61 when the organic EL panel 50 is not bent by referring to the aging LUT for the transistor using the obtained aging time. Furthermore, the bending detection unit 99 detects the bending state of the organic EL panel 50 by comparing the threshold voltage and the gain of the transistor 61 based on the voltage Vma measured in the period T2 with the threshold voltage and the gain of the transistor 61 estimated using the two types of the aging LUTs. Also in this case, the correction unit 89 corrects the video signal VS1 based on the bending state detected by the bending detection unit 90.

As described above, in the organic EL display device 5 according to the present embodiment, the organic EL panel 50 includes only the display pixel circuits (pixel circuits included in the display unit 51), and the bending detection unit 90 detects the bending state of the display panel based on the measurement result of the current flowing through the drive element in the display pixel circuit. According to the organic EL display device 5, a yield of the organic EL panel 50 can be improved and a cost of the organic EL display device can be reduced by using the display pixel circuits as the measurement pixel circuits.

Note that the organic EL display device according to the first to sixth embodiments measure currents for the pixel circuits 60 in one row in one frame period. Alternatively, the organic EL display device of the present invention may measure the currents for the pixel circuits 60 in a plurality of rows sequentially row by row in one frame period. Furthermore, the organic EL display device of the present invention may select the pixel circuits 60 in a plurality of rows collectively and may measure the current flowing through the data lines from the plurality of the pixel circuits 60. In the organic EL display devices according to the first to sixth embodiments, the display area has a rectangular shape. Alternatively, in the organic EL display device of the present invention, the display area may have a shape other than a rectangle (for example, an elliptical shape or a diamond shape).

In the first to sixth embodiments, as an example, the organic EL display devices including the pixel circuit 60 and the output/measurement circuit 70 are described. The present invention can also be applied to an organic EL display device including other pixel circuits and other current measurement circuits. Furthermore, the present invention can be applied to a flexible display device other than the organic EL display device.

This application is an application claiming priority based on Japanese Patent Application No. 2015-235388 filed on Dec. 2, 2015 entitled "Flexible display device and method for detecting bending state thereof", and the content of which is incorporated herein by reference.

INDUSTRIAL APPLICABILITY

Since the display device of the present invention has a feature that a bending state of a screen can be detected and a change in brightness or color when the screen is bent can be prevented, the display device can be used for various types of flexible display devices including an organic EL display device.

DESCRIPTION OF REFERENCE CHARACTERS 1, 2, 3, 4, 5: ORGANIC EL DISPLAY DEVICE
10, 20, 30, 40, 50, 100: ORGANIC EL PANEL 11, 21, 31, 41, 51, 101: DISPLAY UNIT
12, 22, 32, 42, 102: DETECTION UNIT
13, 19: DISPLAY CONTROL CIRCUIT
14: SCANNING LINE DRIVE CIRCUIT
15: DATA LINE DRIVE CIRCUIT
16: CORRECTION DATA STORAGE UNIT
43: DISPLAY LAYER
44: DETECTION LAYER
60: PIXEL CIRCUIT
61: TRANSISTOR (DRIVE ELEMENT)
64: ORGANIC EL ELEMENT (LIGHT EMITTING ELEMENT)
70: OUTPUT/MEASUREMENT CIRCUIT
80, 89: CORRECTION UNIT
90, 99: BENDING DETECTION UNIT

The invention claimed is:

1. A flexible display device comprising:
a bendable display panel including a plurality of scanning lines, a plurality of data lines, and a plurality of pixel circuits each including a light emitting element and a drive element;
a scanning line drive circuit that selects the plurality of pixel circuits by driving the plurality of scanning lines;
a data line drive circuit that performs, by driving the plurality of data lines, an operation of writing a voltage to a control terminal of the drive element, and an operation of measuring a current flowing through the drive element for each of the plurality of pixel circuits selected by the scanning line drive circuit;
bending detection circuitry that detects a bending state of the display panel based on a measurement result of the current flowing through the drive element; and
correction circuitry that corrects a video signal based on the bending state detected by the bending detection circuitry to compensate for a change of an amount of the current flowing through the drive element, the change caused by bending, wherein
the data line drive circuit applies, to the plurality of data lines, voltages based on the video signal corrected by the correction circuitry,
the correction circuitry obtains a first characteristic being an electrical characteristic of the drive element and a second characteristic being an electrical characteristic of the light emitting element, and
the bending detection circuitry estimates, based on the second characteristic, a third characteristic being the electrical characteristic of the drive element when the display panel is not bent, and detects the bending state of the display panel by comparing the first characteristic and the third characteristic.

2. The flexible display device according to claim 1, wherein
the plurality of pixel circuits are either display pixel circuits or measurement pixel circuits, and
at least one of the display pixel circuits and at least one of the measurement pixel circuits are connected to a same scanning line of the plurality of scanning lines.

3. The flexible display device according to claim 1, wherein
the plurality of pixel circuits are either display pixel circuits or measurement pixel circuits, and
at least one of the display pixel circuits and at least one of the measurement pixel circuits are connected to a same data line of the plurality of data lines.

4. The flexible display device according to claim 1, wherein, among the plurality of pixel circuits, an arrangement of measurement pixel circuits is different from an arrangement of display pixel circuits.

5. The flexible display device according to claim 4, wherein an arrangement interval of the measurement pixel circuits is different from an arrangement interval of the display pixel circuits.

6. The flexible display device according to claim 1, wherein, among the plurality of pixel circuits, display pixel circuits and measurement pixel circuits are arranged inside a display area in a mixed manner.

7. The flexible display device according to claim 1, wherein
a display area of the flexible display device has a rectangular shape, and
measurement pixel circuits included in the plurality of pixel circuits are arranged along two adjacent sides of the display area.

8. The flexible display device according to claim 1, wherein one of the first to the third electrical characteristics of the drive element in a measurement pixel circuit is different from a corresponding one of the first to the third electrical characteristics of the drive element in a display pixel circuit.

9. A flexible display device comprising:
a bendable display panel including a plurality of scanning lines, a plurality of data lines, and a plurality of pixel circuits each including a light emitting element and a drive element;
a scanning line drive circuit that selects the plurality of pixel circuits by driving the plurality of scanning lines;
a data line drive circuit that performs, by driving the plurality of data lines, an operation of writing a voltage to a control terminal of the drive element and an operation of measuring a current flowing through the drive element for each of the plurality of pixel circuits selected by the scanning line drive circuit;
bending detection circuitry that detects a bending state of the display panel based on a measurement result of the current flowing through the drive element; and
correction circuitry that corrects a video signal based on the bending state detected by the bending detection circuitry, wherein
the data line drive circuit applies, to the plurality of data lines, voltages based on the video signal corrected by the correction circuitry, and
the correction circuitry corrects the video signal corresponding to a bent portion, to a non-display level.

10. The flexible display device according to claim 9, wherein
the plurality of pixel circuits are either display pixel circuits or measurement pixel circuits, and
at least one of the display pixel circuits and at least one of the measurement pixel circuits are connected to a same scanning line of the plurality of scanning lines.

11. The flexible display device according to claim 9, wherein
the plurality of pixel circuits are either display pixel circuits or measurement pixel circuits, and
at least one of the display pixel circuits and at least one of the measurement pixel circuits are connected to a same data line of the plurality of data lines.

12. The flexible display device according to claim 9, wherein, among the plurality of pixel circuits, an arrangement of measurement pixel circuits is different from an arrangement of display pixel circuits.

13. The flexible display device according to claim 12, wherein an arrangement interval of the measurement pixel circuits is different from an arrangement interval of the display pixel circuits.

14. The flexible display device according to claim 9, wherein, among the plurality of pixel circuits, display pixel circuits and measurement pixel circuits are arranged inside a display area in a mixed manner.

15. The flexible display device according to claim 9, wherein
- a display area of the flexible display device has a rectangular shape, and
- measurement pixel circuits of the plurality of pixel circuits are arranged along two adjacent sides of the display area.

16. The flexible display device according to claim 9, wherein an electrical characteristic of the drive element in a measurement pixel circuit of the plurality of pixel circuits is different from an electrical characteristic of the drive element in a display pixel circuit of the plurality of pixel circuits.

* * * * *